US012787087B2

(12) United States Patent
Kumagai et al.

(10) Patent No.: US 12,787,087 B2
(45) Date of Patent: Nov. 3, 2026

(54) COMMUNICATION DEVICE AND COMMUNICATION METHOD FOR CONNECTION REQUEST HANDLING

(71) Applicant: NTT DOCOMO, INC., Tokyo (JP)

(72) Inventors: Shinya Kumagai, Tokyo (JP); Shohei Yoshioka, Tokyo (JP); Haruhi Echigo, Tokyo (JP); Yuki Hokazono, Tokyo (JP); Yuki Takahashi, Tokyo (JP); Daisuke Kurita, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 533 days.

(21) Appl. No.: 18/263,445

(22) PCT Filed: Feb. 22, 2021

(86) PCT No.: PCT/JP2021/006703
§ 371 (c)(1),
(2) Date: Jul. 28, 2023

(87) PCT Pub. No.: WO2022/176213
PCT Pub. Date: Aug. 25, 2022

(65) Prior Publication Data
US 2024/0314867 A1 Sep. 19, 2024

(51) Int. Cl.
*H04W 4/00* (2018.01)
*H04L 5/00* (2006.01)
(Continued)

(52) U.S. Cl.
CPC ........... *H04W 76/15* (2018.02); *H04L 5/0053* (2013.01); *H04W 8/22* (2013.01)

(58) Field of Classification Search
CPC ................................ H04W 76/15; H04W 8/22
See application file for complete search history.

(56) References Cited

U.S. PATENT DOCUMENTS

| | | | | |
|---|---|---|---|---|
| 2010/0151852 A1 | | 6/2010 | Mori et al. | |
| 2012/0178448 A1* | | 7/2012 | Yuk ...................... | H04W 88/06 455/435.1 |

(Continued)

FOREIGN PATENT DOCUMENTS

| | | | |
|---|---|---|---|
| JP | 2012-506164 A | 3/2012 | |
| JP | 2016-154394 A | 8/2016 | |

(Continued)

OTHER PUBLICATIONS

ISA, English Translation of the Written Opinion of the International Searching Authority PCT/JP2021/006703, Aug. 22, 2023, WIPO, pp. 1-5. (Year: 2023).*

(Continued)

*Primary Examiner* — Elisabeth Benoit Magloire
(74) *Attorney, Agent, or Firm* — Osha Bergman Watanabe & Burton LLP

(57) ABSTRACT

A communication device includes: a transmission unit configured to transmit a connection request to a first communication device; a reception unit configured to receive connection permission from the first communication device; and a control unit configured to establish a first connection to the first communication device. The control unit controls a wireless communication of a second communication device, and, in a case where the connection to the first communication device is established, the reception unit receives, from the first communication device, a signal related to execution of a function of controlling the wireless communication of the second communication device and performing the wireless communication of the first communication device, and the control unit performs enabling or disabling of the function, based on the signal related to the execution of the function.

3 Claims, 28 Drawing Sheets

(51) Int. Cl.

| | |
|---|---|
| ***H04W 8/22*** | (2009.01) |
| ***H04W 76/15*** | (2018.01) |

(56) References Cited

U.S. PATENT DOCUMENTS

| | | | | |
|---|---|---|---|---|
| 2013/0201956 | A1 | 8/2013 | Cho et al. | |
| 2013/0287014 | A1 * | 10/2013 | Yuk | H04W 48/08 370/338 |
| 2016/0286459 | A1 | 9/2016 | Enomoto et al. | |
| 2024/0414231 | A1 * | 12/2024 | Vodovozov | H04W 24/02 |
| 2025/0294048 | A1 * | 9/2025 | Jin | H04L 63/20 |
| 2026/0059290 | A1 * | 2/2026 | Shinozuka | H04W 8/005 |

FOREIGN PATENT DOCUMENTS

| | | | |
|---|---|---|---|
| WO | 2008/136416 | A1 | 11/2008 |
| WO | 2015062043 | A1 | 5/2015 |
| WO | 2016048051 | A1 | 3/2016 |

OTHER PUBLICATIONS

3GPP TS 38.300 V16.4.0; "3rd Generation Partnership Project; Technical Specification Group Radio Access Network; NR; NR and NG-RAN Overall Description; Stage 2 (Release 16)"; Dec. 2020 (149 pages).

NTT DOCOMO, Inc.; White Paper "5G Evolution and 6G"; Jan. 2020 (17 pages).

International Search Report issued in PCT/JP2021/006703 on Oct. 12, 2021 (5 pages).

Written Opinion of the International Searching Authority issued in PCT/JP2021/006703 on Oct. 12, 2021 (4 pages).

Office Action issued in Japanese Patent Application No. 2023-500503, dated Nov. 5, 2024 (5 pages).

Office Action issued in Japanese Patent Application No. 2023-500503, dated Jun. 10, 2025 (6 pages).

Extended European Search Report issued in Application No. 21926642.6, mailed Oct. 28, 2024 (10 pages).

Office Action issued in counterpart Chinese Patent Application No. 202180093710.1 mailed on Mar. 20, 2026 (17 pages).

Office Action issued in counterpart Chinese Patent Application No. 202180093710.1 mailed on Jul. 3, 2026 (13 pages).

* cited by examiner

COMMUNICATION DEVICE AND COMMUNICATION METHOD FOR CONNECTION REQUEST HANDLING

FIELD OF THE INVENTION

The present invention relates to a communication device and a communication method in a wireless communication system.

BACKGROUND OF THE INVENTION

In 3GPP (3rd Generation Partnership Project), in order to realize further larger system capacity, further faster data transmission speed, further lower latency in a wireless communication section, etc., a wireless communication method called “5G” or “NR (New Radio)” has been discussed (hereinafter, the wireless communication method is referred to as “NR”). In 5G, various wireless technologies and network architectures are being discussed to satisfy the requirement of a radio link delay of 1 ms or less while achieving throughput of 10 Gbps or more (e.g., non-patent literature 1).

In addition, discussions on 6G as the next generation wireless communication method to 5G have been started, and the radio quality exceeding 5G is expected to be achieved. For example, in 6G, discussions are being held aiming at, for example, further increasing the capacity, using a new frequency band, further reducing the latency, further increasing the reliability, and increasing the coverage in the new areas (high altitude, ocean, and universe) (for example, non-patent document 2).

CITATION LIST

Non-Patent Document

[Non-Patent Document 1] 3GPP TS 38.300 V16.4.0 (2020-12)

[Non-Patent Document 2] NTT DOCOMO, INC White Paper “5G Evolution and 6G” (2020-01)

SUMMARY OF THE INVENTION

Technical Problem

In 6G, frequencies higher than the conventional frequencies are expected to be used aiming at the further improvement of the communication speed, capacity, reliability, latency performance, etc. In a case where the higher frequencies are used, the higher speed can be achieved because an extremely wide bandwidth can be used, and the lower latency can be achieved because of the shorter symbol length. On the other hand, it is expected that the coverage will be narrower due to the larger attenuation rate and the reliability will be lower due to the stronger tendency to travel through a straight path.

According to the characteristics of the frequency band in which the higher frequencies are used, it is important to ensure redundancy in order to provide services to an area in which the 6G communication is needed.

The present invention has been made in view of the above points, and it is an object of the present invention to ensure network redundancy in a wireless communication system.

Solution to Problem

According to the disclosed technique, a communication device is provided. The communication device includes: a transmission unit configured to transmit a connection request to a first communication device; a reception unit configured to receive connection permission from the first communication device; and a control unit configured to establish a first connection to the first communication device. The control unit controls a wireless communication of a second communication device, and, in a case where the connection to the first communication device is established, the reception unit receives, from the first communication device, a signal related to execution of a function of controlling the wireless communication of the second communication device and performing the wireless communication of the second communication device, and the control unit performs enabling or disabling of the function, based on the signal related to the execution of the function.

Advantageous Effects of Invention

According to the disclosed technique, a technique for ensuring the network redundancy in a wireless communication system is provided.

DETAILED DESCRIPTION OF THE PREFERRED EMBODIMENTS

Figure 1:
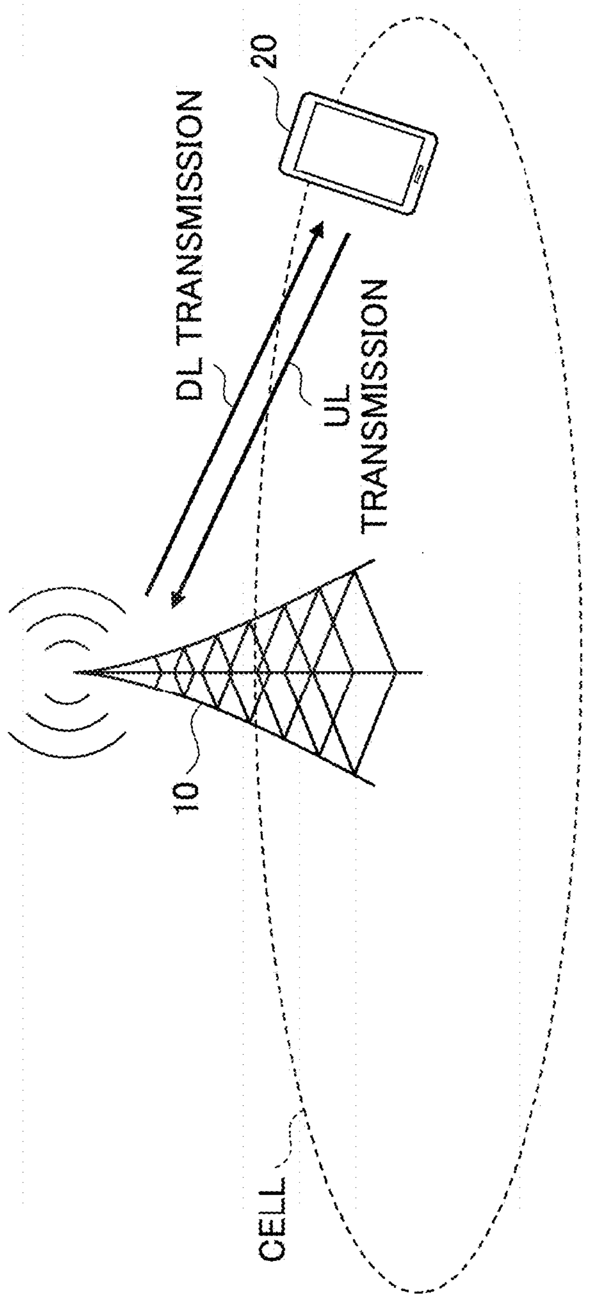
FIG. 1 is a drawing illustrating an example (1) of a wireless communication system according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used accordingly. The conventional techniques include, but are not limited to, conventional NR or LTE, for example.

FIG. 1 is a drawing illustrating an example (1) of a wireless communication system according to an embodiment of the present invention. As illustrated in FIG. 1, a wireless communication system according to an embodiment of the present invention includes a base station 10 and a terminal 20. In FIG. 1, a single base station 10 and a single terminal 20 are illustrated as an example. There may be a plurality of base stations 10 and a plurality of terminals 20.

The base station 10 is a communication device that provides one or more cells and performs wireless communications with the terminal 20. Physical resources of the radio signal may be defined in the time domain and the frequency domain, the time domain may be defined by the number of Orthogonal Frequency-Division Multiplexing (OFDM) symbols, and the frequency domain may be defined by the number of sub-carriers or resource blocks. Further, a TTI (Transmission Time Interval) in the time domain may be a slot, or the TTI may be a subframe.

The base station 10 can perform carrier aggregation to communicate with the terminal 20 by bundling a plurality of cells (multiple CCs (component carriers)). One PCell (primary cell) and one or more SCells (secondary cells) are used in the carrier aggregation.

The base station 10 transmits a synchronization signal, system information, and the like, to the terminal 20. The synchronization signal is, for example, a New Radio Primary Synchronization Signal (NR-PSS) and a New Radio Secondary Synchronization Signal (NR-SSS). The system information may be transmitted via a New Radio Physical Broadcast Channel (NR-PBCH) or a Physical Downlink Shared Channel (PDSCH), for example, and may be referred to as broadcast information. As shown in FIG. 1, the base station 10 transmits a control signal or data in DL (Downlink) to the terminal 20 and receives a control signal or data in UL (Uplink) from the terminal 20. Note that, here, what is transmitted via a control channel such as Physical Uplink Control Channel (PUCCH) and Physical Downlink Control Channel (PDCCH) is called a control signal, and what is transmitted via a shared channel such as PUSCH and PDSCH is called data. These names are mere examples.

The terminal 20 may be a communication apparatus that includes a wireless communication function such as a smartphone, a mobile phone, a tablet, a wearable terminal, a communication module for M2M (Machine-to-Machine), or the like. As shown in FIG. 1, the terminal 20 uses various communication services provided by the wireless communication system by receiving control signals or data in DL from the base station 10 and transmitting control signals or data in UL to the base station 10. Note that the terminal 20 may be referred to as a UE, and the base station 10 may be referred to as a gNB.

The terminal 20 can perform carrier aggregation to communicate with the base station 10 by bundling a plurality of cells (a plurality of CCs (component carriers)). One PCell (primary cell) and one or more SCells (secondary cells) are used in the carrier aggregation. In addition, PUCCH-SCell having PUCCH may be used.

Figure 2:
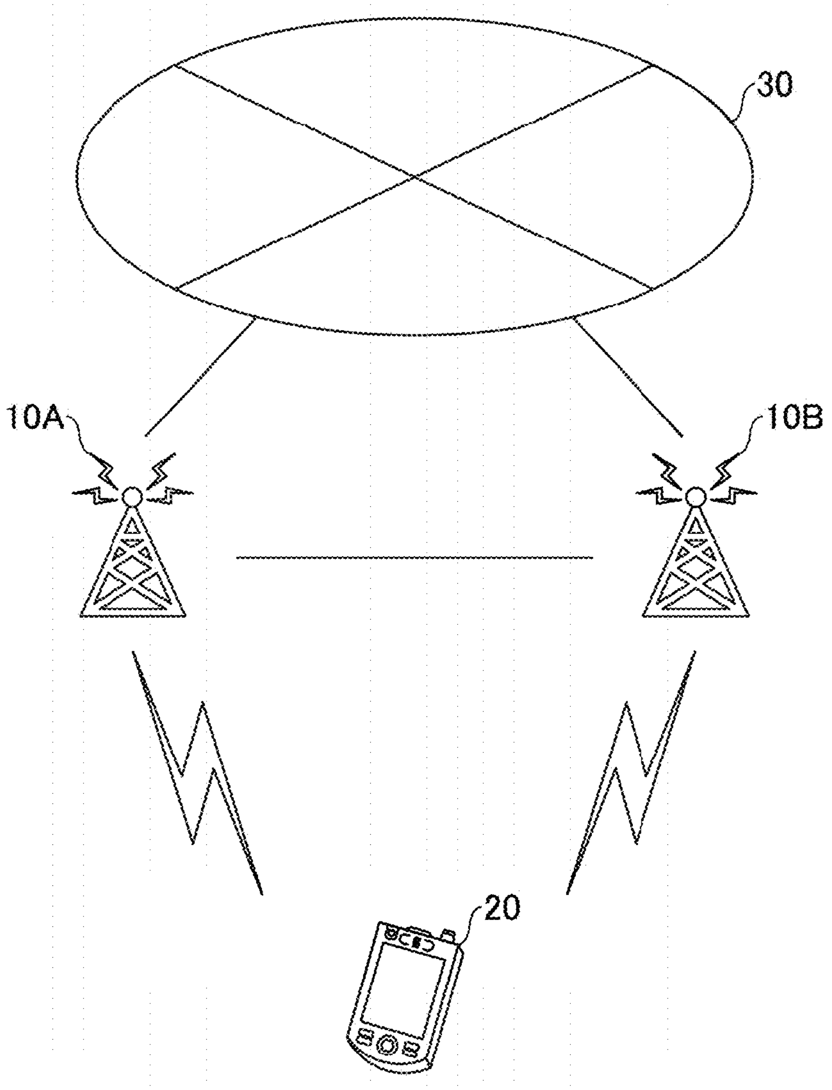
FIG. 2 is a drawing illustrating an example (1) of a wireless communication system according to an embodiment of the present invention.

FIG. 2 is a drawing illustrating an example (2) of a wireless communication system according to an embodiment of the present invention. FIG. 2 shows an example of a configuration of a wireless communication system in a case where DC (Dual connectivity) is performed. As shown in FIG. 2, a base station 10A serving as an MN (Master Node) and a base station 10B serving as an SN (Secondary Node) are provided. The base station 10A and the base station 10B are each connected to a core network. The terminal 20 is enabled to communicate with both the base station 10A and the base station 10B.

A cell group provided by the base station 10A that is an MN is called an MCG (Master Cell Group), and a cell group provided by the base station 10B that is an SN is called an SCG (Secondary Cell Group). In addition, in DC, the MCG includes one PCell and one or more SCells, and the SCG includes one PSCell (Primary SCG Cell) and one or more SCells.

Note that the DC may be a communication method using two communication standards, and any type of communication standards may be combined. For example, the combination may be NR and 6G standards, or may be LTE and 6G standards. In addition, the DC may be a communication method using three or more communication standards and may be referred to as another name different from the DC.

Processing operations in this embodiment may be performed in a system configuration shown in FIG. 1, in a system configuration shown in FIG. 2, or in other system configurations.

Here, in 6G, frequencies higher than the conventional frequencies are expected to be used aiming at the further improvement of the communication speed, capacity, reliability, latency performance, etc. For example, qualities such as extreme-high-speed communication of the order of terabps, high reliability of an optical communication level, low latency, and the like, are expected to be required. For example, in a case where high frequencies such as terahertz waves are used, the higher speed can be achieved because an extremely wide bandwidth can be used, and the lower latency can be achieved because of the shorter symbol length. On the other hand, it is expected that the coverage will be narrower due to the larger attenuation rate and the reliability will be lower due to the stronger tendency to travel through a straight path.

According to the characteristics of the frequency band in which the higher frequencies are used, it is important to ensure redundancy in order to provide services to an area in which the 6G communication is needed.

Therefore, discussions are being held regarding performing wireless communications between AP-UE by installing an access point (AP: Access point) not by an MNO (Mobile network operator) but by a user. Hereinafter, the AP may be referred to as a configurable access point or C-AP (Configurable AP). However, the name is not limited to this name, and may be UE or a communication device. In addition, the C-AP may be installed not by a user but by the MNO. In addition, the device connected to the C-AP is not limited to the UE, and may be a communication device.

Figure 3:
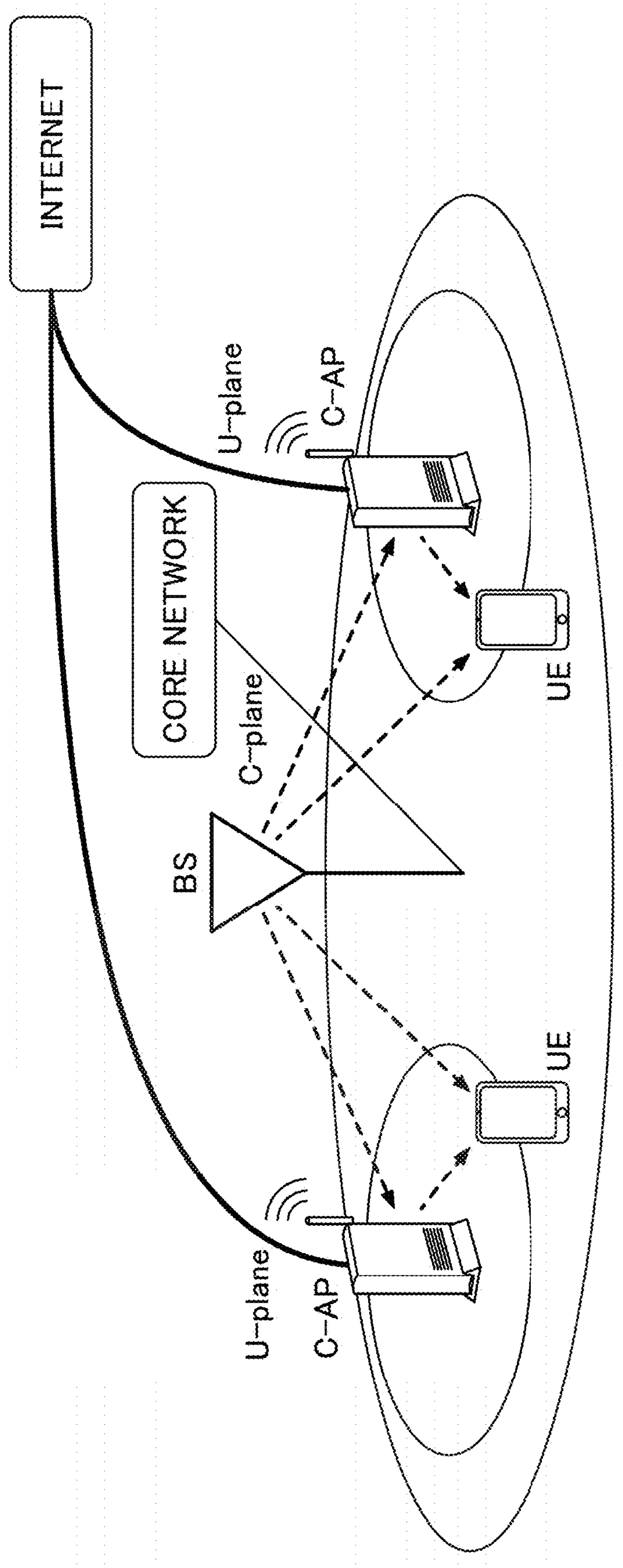
FIG. 3 is drawing illustrating an example of a network configuration in an embodiment of the present invention.

FIG. 3 is drawing illustrating an example of a network configuration in an embodiment of the present invention. As illustrated in FIG. 3, AP is connected to the Internet via a fixed line, and thus, uses high speed, high reliability and low latency of the optical communication. Alternatively, AP may be connected to the Internet via wireless communications. The connection between AP-UE is implemented by 6G wireless communication. For example, the wireless communication may be a high-frequency wireless communication. The AP may be controlled by the MNO according to a wired communication via a fixed line, or may be controlled by the MNO according to a wireless communication (for example, with a conventional base station). The control may be, for example, turning On/Off of the C-AP, configuring the radio resources that can be used by the C-AP, or configuring the communication between the C-AP and the UE.

As illustrated in FIG. 3, the U-plane connection of the UE may be established between the C-AP and the Internet, or the C-plane connection of the UE may be established between the C-AP and the BS (Base station). In addition, the UE may be enabled to perform wireless communications with the BS. Note that the BS is connected to a core network.

Figure 4:
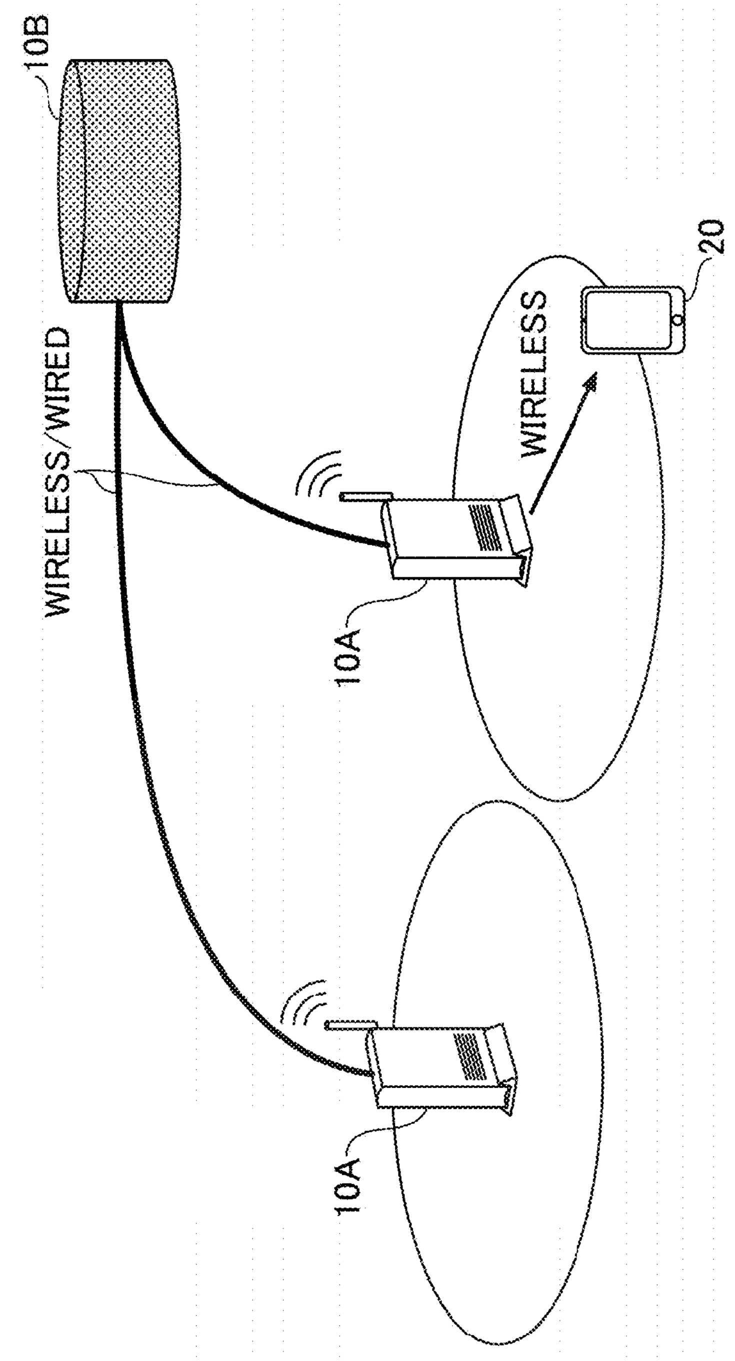
FIG. 4 is a drawing illustrating an example of connections between devices in an embodiment of the present invention.

FIG. 4 is a drawing illustrating an example of connections between devices in an embodiment of the present invention. As illustrated in FIG. 4, when establishing the connection between the C-AP and the MNO, wireless communications or wired communications are performed between a device 10A and a device 10B. The device 10A has a predetermined function corresponding to the C-AP and the device 10B controls the device 10A. Hereinafter, the predetermined function is denoted as a function X. The function X may be a function of controlling wireless communications with the terminal 20 or a function of performing the wireless communications with the terminal 20. As illustrated in FIG. 4, a plurality of devices 10A may be connected to the device 10B.

The device 10A may be any one of the following 1) to 4).

1) May be a base station device not included in the device 10B, for example, may be one or more of CU (Central Unit), DU (Distributed Unit), and RU (Radio Unit), or may be a device corresponding to one of PLMNs (Public Land Mobile Networks).
2) The device 10A may be a function or system.
3) The device 10A may be a device, function, or system that is not provided by the device 10B.
4) The device 10A may be, but not limited to, a UE, an AP, an AP having a UE function.

The device 10B may be any one of the following 1) to 4).

1) May be one or more of CU (Central Unit), DU (Distributed Unit), and RU (Radio Unit) included in the base station device, or may be a device corresponding to one of PLMNs (Public Land Mobile Networks).
2) The device 10B may be a function or system.
3) The device 10B may be a device, function, or system that is provided by the MNO.
4) The device 10B may be, but not limited to, a UE, an AP, an AP having a UE function.

The terminal 20 may be a communication device, and may be, but not limited to, a UE or a device 10A. The terminal 20 can establish connections in the PLMN to which the device 10A belongs, via the device 10A.

The communication between the device 10A and the device 10B may be a wireless communication via a predetermined frequency or a wired communication. The wireless communication may belong to the same radio access technology (RAT: Radio Access Technology) as that of the wireless communication between the device 10A and the terminal 20, or may belong to a different RAT. The predetermined frequency may be the same frequency as that of the wireless communication between the device 10A and the terminal 20, or may be a different frequency. The device 10A may operate as a UE in a case where the device 10A performs communications with the device 10B.

Figure 5:
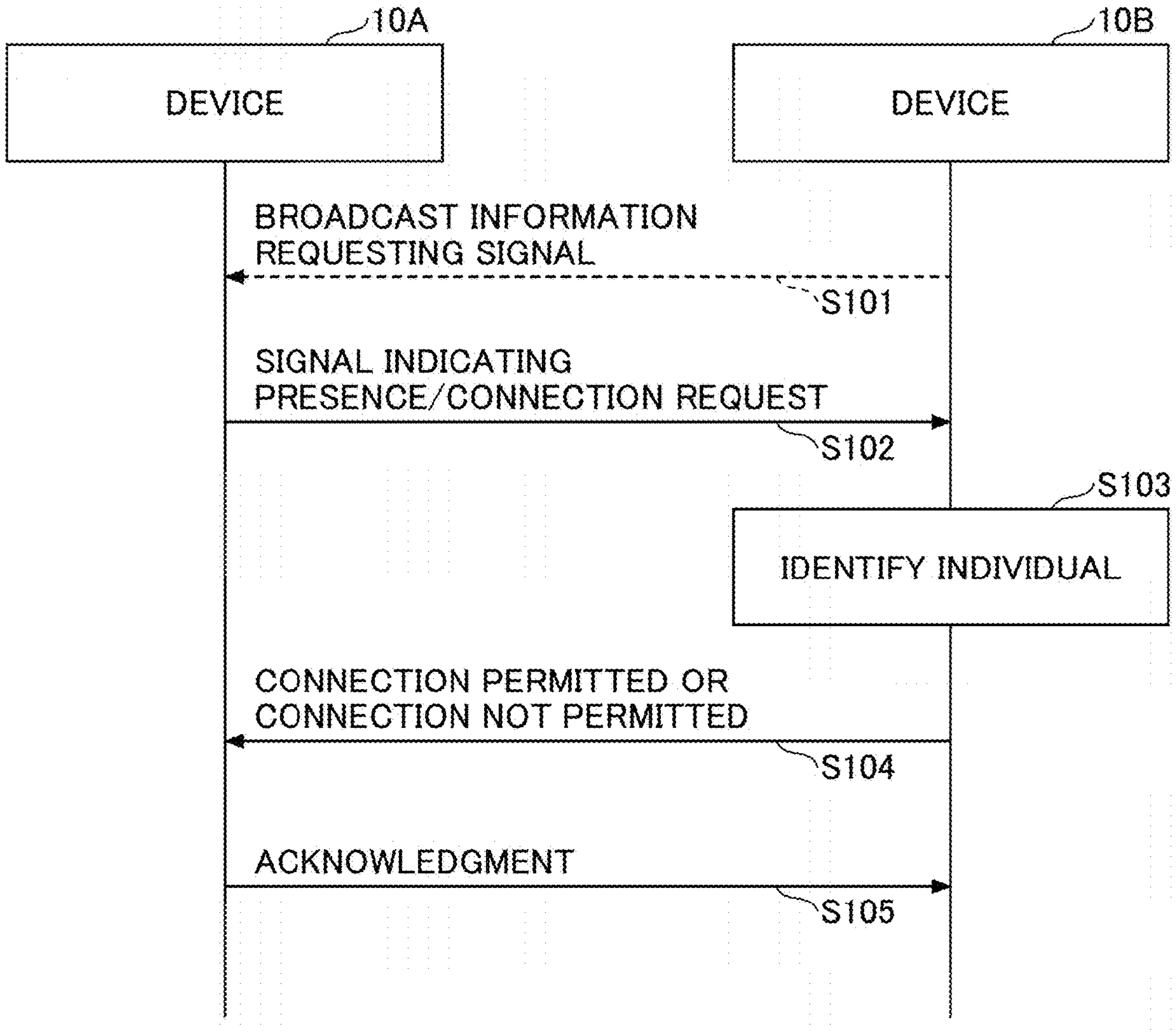
FIG. 5 is a sequence diagram illustrating an example of establishing a connection in an embodiment of the present invention.

The connection establishment may be performed between the device 10A and the device 10B. FIG. 5 is a sequence diagram illustrating an example of establishing a connection in an embodiment of the present invention. That is, the device 10B may recognize the device 10A. Note that, at least one of the following steps is not required to be performed.

In step S101, the device 10B may broadcast information requesting a signal from the device 10A. Step S101 may be performed, or is not required to be performed. In step S102, the device 10A transmits a signal indicating its presence and/or a connection request to the device 10B.

In subsequent step S103, the device 10B identifies an individual, based on the signal from the device 10A. In subsequent step S104, the device 10B transmits a signal indicating connection permitted and/or completed, or connection not permitted, to the device 10A. In subsequent step S105, the device 10A transmits an acknowledgment to the device 10B after receiving a signal related to connection permitted and/or completed. The connection may be determined to be established between the device 10A and the device 10B when steps up to step S105 are completed.

During the connection establishment, for example, in step S102 or step S105, the signal transmitted from the device 10A to the device 10B may include one or more of: PLMN to be connected; capability of the terminal 20 related to the communication control; service type; communication requirements; cover area; location information; corresponding frequencies; and antenna and/or beam radio characteristics. The location information may be location information of the device 10A or may be location information of the terminal 20.

Predetermined operations illustrated in the following 1) to 3) may be performed depending on connection situations between the device 10A and the device 10B.

1) Connection management and/or maintenance may be performed by using a predetermined timer. For example, transmission and reception of a signal related to the connection may be performed periodically. For example, the connection may be determined to be lost in a case where the transmission and reception of the predetermined signal is not completed until expiration of the predetermined timer.
2) The device 10A may stop the function X in a case where the connection is lost.
3) The device 10A may indicate to the subordinate terminal 20 that the device 10A stops the function X in a case where the connection is lost. For example, the device 10A may stop the function X after a predetermined time elapses after the indication.

According to the above-described embodiment, the connection can be established between the C-AP and the device that controls the C-AP.

The predetermined information may be transmitted from the device 10A that has already been connected to the device 10B to the device 10B. The predetermined information may be transmitted: before the device 10A operates as a C-AP; during the time when the device 10A operates as a C-AP; or both before the device 10A operates as a C-AP and during the time when the device 10A operates as a C-AP. The operation as a C-AP may be wireless communications with the terminal 20, or may be an operation related to the function X.

Figure 6:
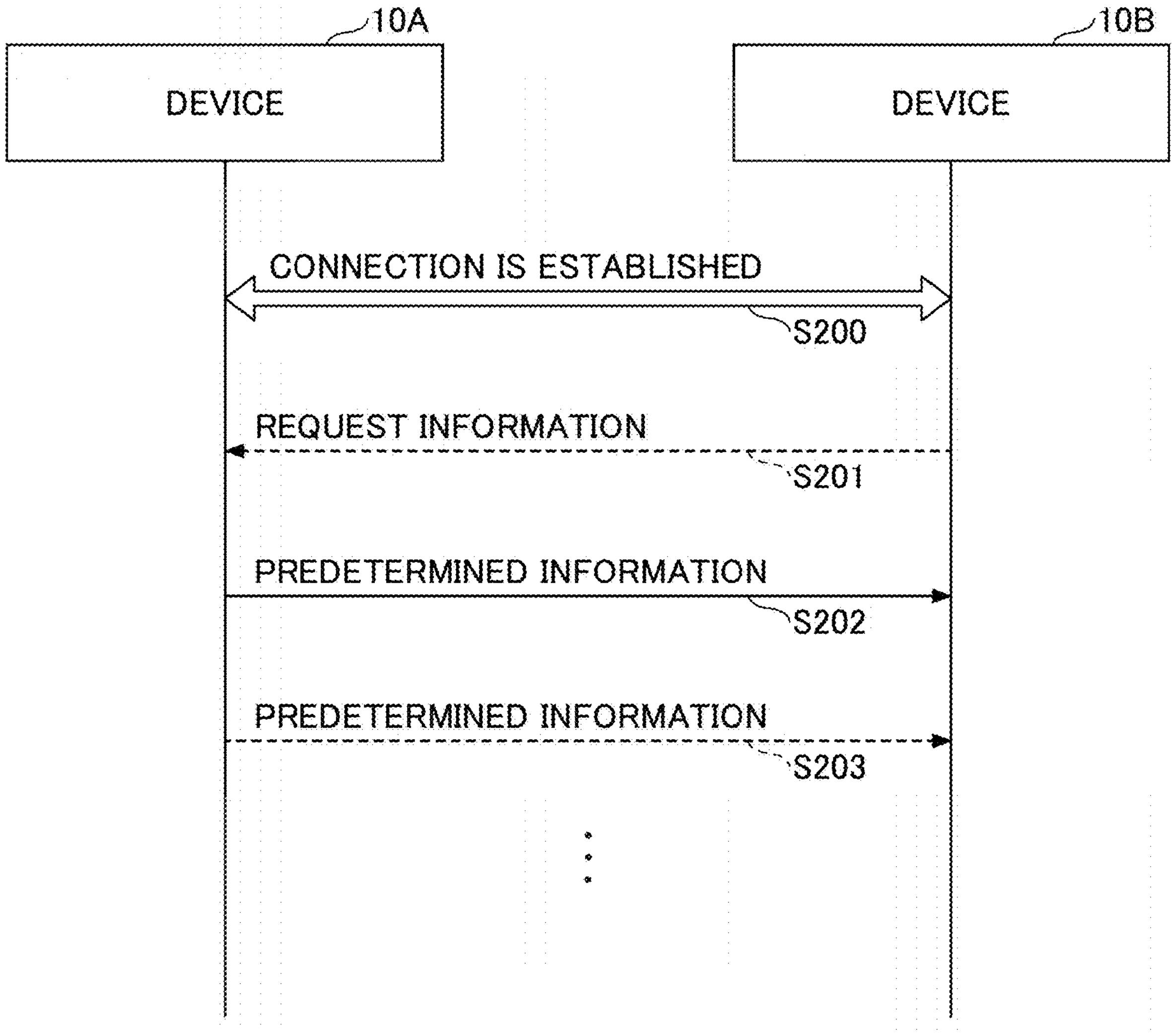
FIG. 6 is a sequence diagram illustrating an example (1) of reporting information in an embodiment of the present invention.

FIG. 6 is a sequence diagram illustrating an example (1) of reporting information in an embodiment of the present invention. In step S200, the connection is established between the device 10A and the device 10B. In step S201, the device 10B transmits a signal requesting information to the device 10A. Step S201 may be performed, or is not required to be performed. In step S202, the device 10A transmits predetermined information to the device 10B. In subsequent step S203, the device 10A may further transmit predetermined information to the device 10B.

The transmission timing of the predetermined information may be periodic, and the period may be defined in advance. Alternatively, the transmission timing of the predetermined information may be configured by the device 10B after the completion of the connection. In addition, the transmission timing of the predetermined information may be a timing at which the device 10A enables the function as a C-AP or a function related to wireless communications with the terminal 20, or may be a timing at which the device 10A updates the function related to wireless communications with the terminal 20. In addition, the transmission timing of the predetermined information may be a timing based on the request from the terminal 20.

The predetermined information may be one or more of the following 1) to 4).

1) Channel state. For example, the predetermined information may be a target frequency, a channel use situation, an interference power value or level, another device 10A that can be detected, information related to propagation characteristics measurement, or the like.
2) Service condition. May be, for example, a service type, communication requirements, cover area, the number of devices to be accommodated, communication time, data amount, the degree of achievement with respect to the request, or the like.
3) State of the device 10A. May be, for example, location information, information related to GNSS (Global Navigation Satellite System), longitude and latitude, altitude, area forming angle, or the like.
4) Information related to terminals 20 that can be connected in a case of operating as a C-AP or in a case of enabling the function X. May be, for example, the number of terminals 20, location information, information related to GNSS, longitude and latitude, altitude, area forming angle, or the like.

Regarding all or a part of the predetermined information, information to be transmitted may be selected according to an indication from the device 10B or according to the determination of the device 10A.

Obtaining the predetermined information by the device 10A may be performed based on a broadcast signal and/or a reference signal from the device 10A, or transmission and reception of signals may be performed between a plurality of devices 10A. In addition, the obtaining the predetermined information by the device 10A may be performed based on a transmission signal and/or a reference signal from each terminal 20. The limited communication between the device 10A and the terminal 20 may be allowed for the sake of obtaining the predetermined information. The limited communication may be performed after obtaining a permission from the device 10B. In addition, the limited communication may be performed without obtaining the permission from the device 10B.

Figure 7:
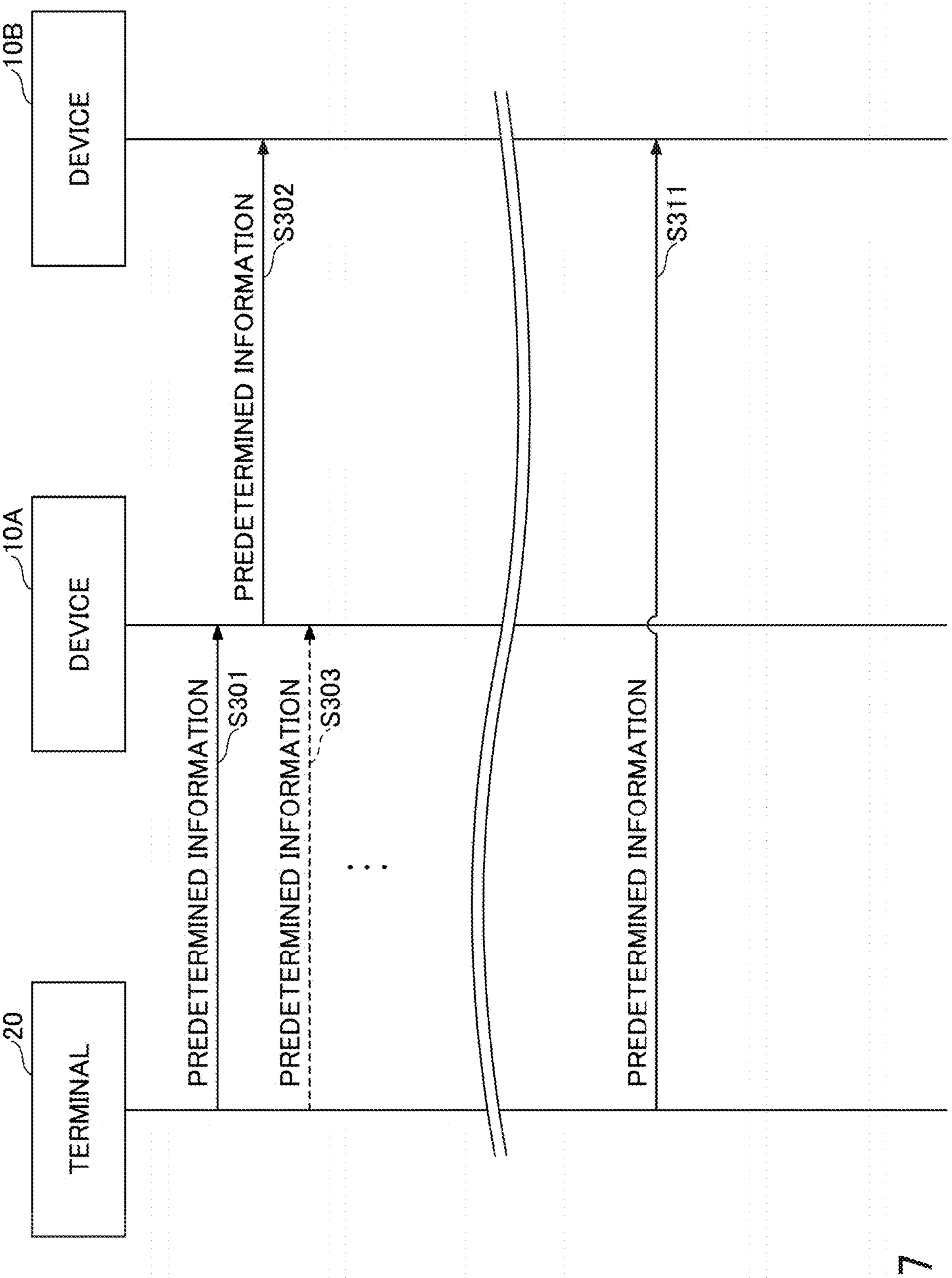
FIG. 7 is a sequence diagram illustrating an example (2) of reporting information in an embodiment of the present invention.

FIG. 7 is a sequence diagram illustrating an example (2) of reporting information in an embodiment of the present invention. Predetermined information may be transmitted from the terminal 20 to the device 10B. In step S301, the terminal 20 may transmit the predetermined information to the device 10A. In subsequent step S302, the device 10A may transmit the received predetermined information to the device 10B. In subsequent step S303, the terminal 20 may further transmit the predetermined information to the device 10B via the device 10A. In addition, in step S311, the terminal 20 may directly transmit the predetermined information to the device 10B via the wireless communication. As described above, an operation of performing direct transmission from the terminal 20 to the device 10B via the wireless communication may be limited to a case in which the device 10A and the device 10B perform the wireless communication.

The transmission timing of the predetermined information may be periodic, and the period may be defined in advance. Alternatively, the transmission timing of the predetermined information may be configured by the device 10A or may be configured by the device 10B. In addition, the transmission timing of the predetermined information may be a timing based on the request from the device 10B to the terminal 20.

The predetermined information may be one or more of the following 1) to 2).

1) Channel state. For example, the predetermined information may be a target frequency, a channel use situation, an interference power value or level, another device 10A that can be detected, information related to propagation characteristics measurement, or the like.

2) Evaluation related to the device 10A. May be, for example, an identification number of the device 10A, communication quality via the device 10A, the degree of achievement with respect to the request, or the like.

The obtaining of the predetermined information by the terminal 20 may be performed based on the broadcast signal, transmission signal, or reference signal from the device 10A. For example, the limited communication between the device 10A and the terminal 20 may be allowed for the sake of obtaining the predetermined information. The limited communication may be performed after obtaining the permission from the device 10B. In addition, the limited communication may be performed without obtaining the permission from the device 10B.

According to the above-described embodiment, after the connection is established between the C-AP and the device that controls the C-AP, information related to the execution of the function X can be indicated from the C-AP to the device that controls the C-AP.

Figure 8:
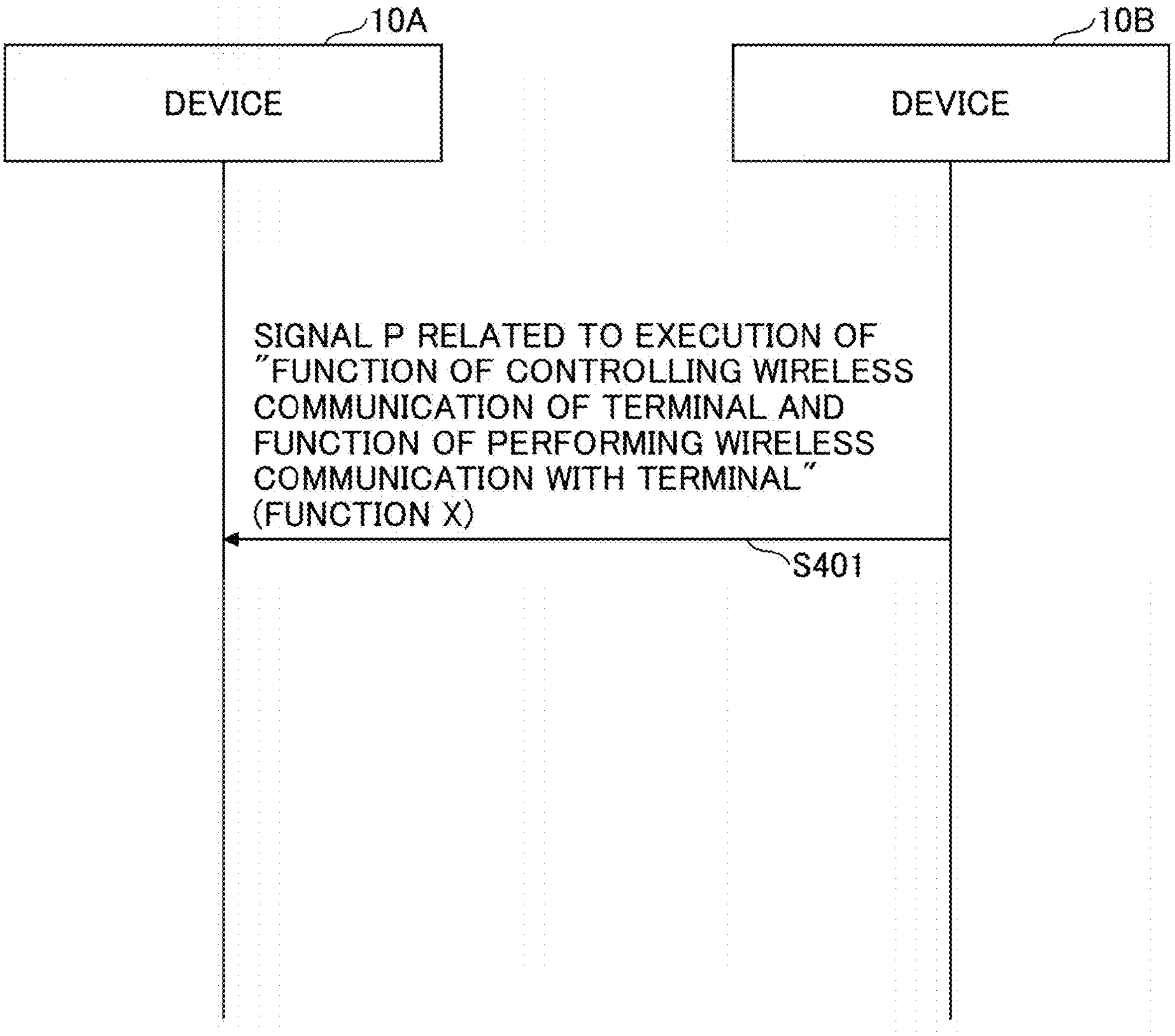
FIG. 8 is a sequence diagram illustrating an example of enabling a function in an embodiment of the present invention.

FIG. 8 is a sequence diagram illustrating an example of enabling a function in an embodiment of the present invention. The device 10A may receive, from the device 10B, a signal P related to the execution of the function X. In step S401, the device 10B transmits, to the device 10A, a signal P related to execution of a function of controlling wireless communications of the terminal and a function of performing the wireless communications with the terminal, that is, the function X.

The device 10A may be assumed to be capable of receiving, from the device 10B, the signal P at any timing. In other words, the signal P may be transmitted from the device 10B to the device 10A according to the MNO trigger.

The device 10A may transmit, to the device 10B, a request for enabling the function or updating the function in a case of performing the function X, and then, may receive the signal P from the device 10B. In other words, the signal P may be transmitted from the device 10B to the device 10A according to the C-AP trigger. In addition, the device 10A may transmit a request for disabling the function to the device 10B in a case of stopping the execution of the function X, and then, may receive the signal P from the device 10B. The device 10A may report, to the device 10B, a communication parameter and/or resources to be used, at the time of transmission of the request. Note that the device 10A may be allowed to transmit the request to the device 10B only in a case where a predetermined condition is satisfied.

The terminal 20 may transmit, to the device 10B, a request for enabling or updating the function X in the device 10A in a case where the device 10A, whose execution of the function X is requested, is present. In other words, the signal P may be transmitted from the device 10B to the device 10A according to the UE trigger. Further, the terminal 20 may transmit, to the device 10B, a request for disabling the function X in the device 10A in a case where the device 10A, whose execution of the function X is requested to be stopped, is present. In a case of the UE trigger, an operation in the device 10A may be the same as that in a case of the MNO trigger. Note that the transmission of the request to the device 10B by the terminal 20 may be allowed only in a case where a predetermined condition is satisfied. The request from the terminal 20 to the device 10B may be transmitted via a device 10A other than the device 10A that is a target of the request, or may be directly transmitted from the terminal 20 to the device 10B via wireless communications. The request may be directly transmitted from the terminal 20 to the device 10B via wireless communications only in a case where the wireless communications are performed between the device 10A and the device 10B.

The terminal 20 may transmit, to the device 10A, a request for enabling or updating the function X in a case where the device 10A, whose execution of the function X is requested, is present. The device 10A may receive a signal P from the device 10B by transferring the request to the device 10B. In other words, the signal P may be transmitted from the device 10B to the device 10A according to the UE trigger. Further, the terminal 20 may transmit, to the device 10A, a request for disabling the function X in a case where the device 10A, whose execution of the function X is requested to be stopped, is present. In a case of the UE trigger, an operation in the device 10A may be the same as that in a case of the MNO trigger. Note that the transmission of the request to the device 10A by the terminal 20 may be allowed only in a case where a predetermined condition is satisfied.

In a case of the above-described MNO trigger or C-AP trigger, at least a part of the following procedures 1) to 4) may be applied.

1) Information indicating recruitment of a device 10A that enables the function X may be transmitted from the device 10B to the device 10A. The information may be PHY signaling according to PDCCH, may be signaling according to MAC-CE (Media Access Control-Control Element) via PDSCH, or may be RRC signaling according to the RRC reconfiguration. The information may be operational contents, an operational parameter, an operational area or location, service requirements, a service type, a reward for the service, etc.
2) Information indicating candidacy of a device 10A that can enable the function X may be transmitted from the device 10A to the device 10B. The information may be PHY signaling according to RACH or SR (Scheduling Request) form of PUCCH, may be signaling according to MAC-CE (Media Access Control-Control Element) via PUSCH, or may be RRC signaling according to the RRC reconfiguration request.
3) Negotiation may be performed between the device 10A that can enable the function X and the device 10B. The negotiation may be related to, for example, operational contents, an operational parameter, priority right related to the enabling of the function X in the future, cost burden or cost reduction related to the enabling of the function X, etc. The negotiation may be PHY signaling according to PDCCH and/or PUCCH, may be signaling according to MAC-CE via PDSCH and/or PUSCH, or may be RRC signaling according to the RRC reconfiguration and/or the reconfiguration request.
4) With respect to a device 10A that can enable the function X, an indication for enabling the function X may be transmitted from the device 10B to the device 10A. The information may be PHY signaling according to PDCCH, may be signaling according to MAC-CE via PDSCH, or may be RRC signaling according to the RRC reconfiguration request.

The radio resources needed for the above-described signaling may be specified in the technical specifications, or may be configured or indicated by the device 10B.

The predetermined condition that enables transmission of a request according to the C-AP trigger and the UE trigger may be a condition based on one of or multiple of the followings. The predetermined condition may be a condition based on: PLMN; capability of the device 10A; capability of the terminal 20; service type; device group, location of the device 10A; location of the terminal 20; altitude of the device 10A, RSRP (Reference Signal Received Power), RSRQ (Reference Signal Received Quality), RSSI (Received Signal Strength Indicator), or a distance between the device 10A and the terminal 20; mobility level of the device 10A or the terminal 20; or device type or category (normal, transport, drone, etc.) of the device 10A or the terminal 20.

Information included in the signal P may be one or more of 1) to 4) below.

1) An indication of enabling the function with respect to the device 10A that has not yet executed the function X, and a communication parameter. The communication parameter may be a permission to a communication parameter reported from the device 10A to the device 10B.
2) Disapproval of enabling the function with respect to the device 10A that has not yet executed the function X.
3) An indication of disabling the function with respect to the device 10A that is executing the function X.
4) A continuation indication of enabling the function with respect to the device 10A that is executing the function X, and an updated parameter. The updated parameter may be a permission to a communication parameter reported from the device 10A to the device 10B.

The device 10A that has received the signal P may perform one or more of the operations illustrated in 1) to 2) below.

1) The device 10A may start communication with the terminal 20 by enabling the function X (by continuing the function X in a case where the function X has already been enabled), based on the received parameter.
2) The device 10A may end the communication with the terminal 20 by disabling the function X. Information indicating that the function X is to be disabled may be indicated to the terminal 20 before the function X is disabled. The terminal 20 that has received the indication may try connection to another device 10A or device 10B.

The above-described operation may be performed after an elapse of predetermined time from the timing at which the above-described signal P is received from the device 10B.

The wireless communication parameter received by the device 10A from the device 10B may be one or more of the following 1) to 5).

1) A parameter related to the transmission timing
2) Available resources, for example, time, frequency, space, or code
3) Available frequencies, for example, band, band combination, carrier component
4) Scheduling rule or limitation, for example, proportional fair type, latency aware type
5) A parameter related to the transmission power control or the beamforming (spatial filter, directivity) of the device 10A or the terminal 20

Figure 9:
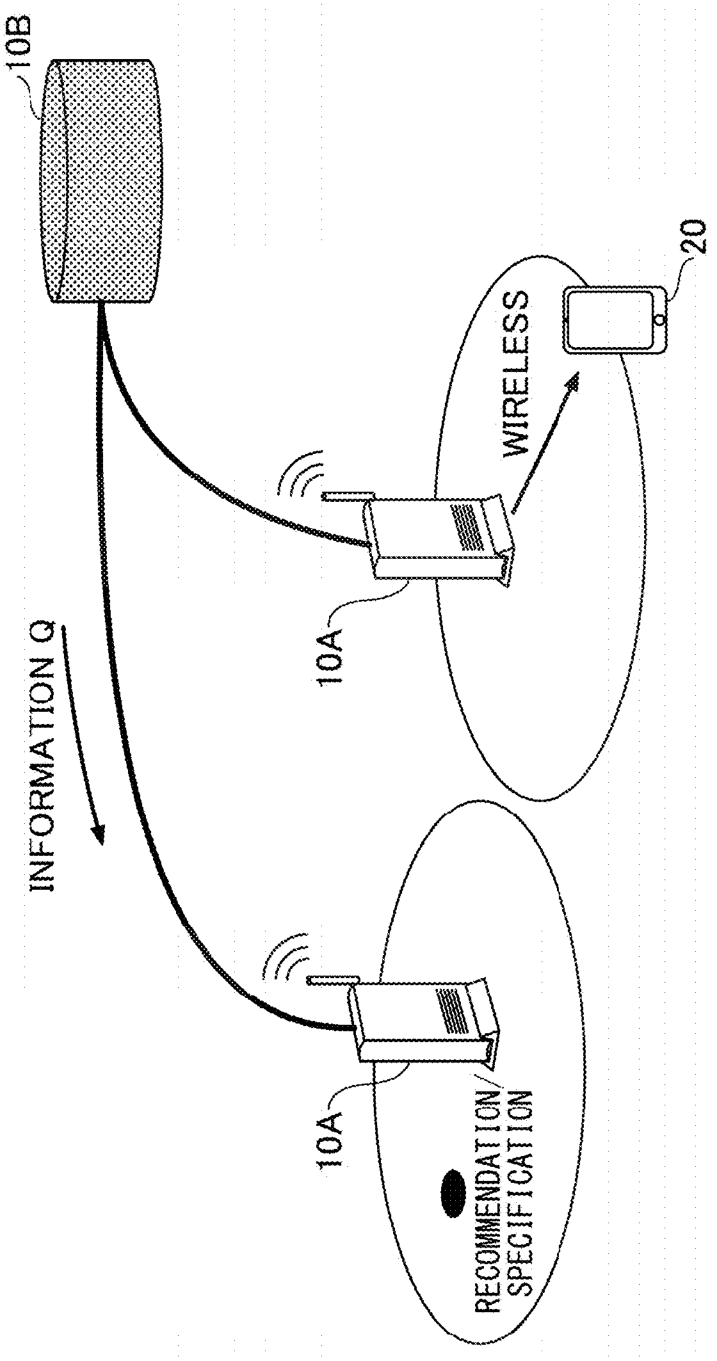
FIG. 9 is a drawing illustrating an example (1) of transmitting and receiving recommendation information in an embodiment of the present invention.

FIG. 9 is a drawing illustrating an example (1) of transmitting and receiving recommendation information in an embodiment of the present invention. As illustrated in FIG. 9, the device 10A may receive, from the device 10B, recommendation or specification information Q related to the installation of the device 10A. In other words, the recommendation or specification for the user who installs the C-AP is assumed.

The device 10A may receive the information Q by performing association with an indication of disapproval of the enabling of the function in the signal P. In addition, the device 10A may receive the information Q in addition to the indication of disapproval of the enabling of the function. In addition, the device 10A may receive the information Q instead of the indication of disapproval of the enabling of the function. In other words, the reception of the information Q may mean the disapproval of the enabling of the function.

The information Q may be transmitted from the device 10B to the device 10A, based on a request from the device 10A. The request may be transmitted in addition to, or may be transmitted instead of, the predetermined information transmitted from the device 10A to the device 10B in step S202. In addition, the request may be a request, transmitted from the device 10A to the device 10B, for enabling the function X or for updating the function.

The information Q may be transmitted from the device 10B and received by the device 10A, by performing association with an operation related to the connection establishment between the device 10A and the device 10B. The information Q may be transmitted in addition to a signal related to the connection permission or completion, or may be transmitted by replacing the signal related to the connection permission or completion. In other words, the reception of the information Q may mean the connection permission or completion.

The information Q may be transmitted from the device 10B to the device 10A even in a case where the function X has already been enabled. For example, the information Q may be received by the device 10A in conjunction with an operation related to the continuation indication of the function X and the provision of an updated parameter, may be received by the device 10A in conjunction with an operation related to an indication of disabling the function X, or may be received by the device 10A by replacing an operation related to an indication of disabling the function X.

Figure 10:
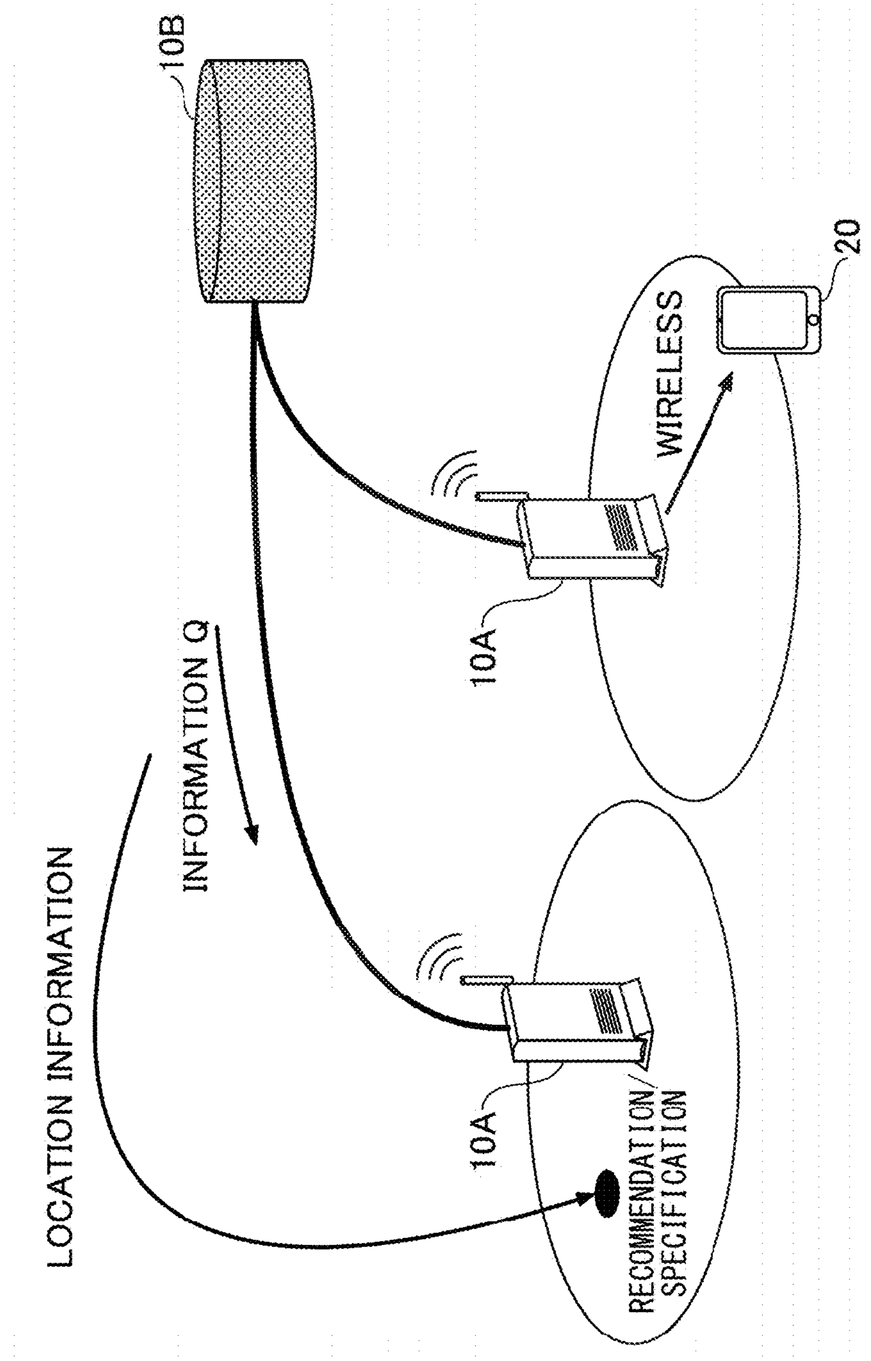
FIG. 10 is a drawing illustrating an example (2) of transmitting and receiving recommendation information in an embodiment of the present invention.

FIG. 10 is a drawing illustrating an example (2) of transmitting and receiving recommendation information in an embodiment of the present invention. The information Q may be one or more of the following 1) to 5).

1) May be information related to propagation characteristic measurement value. For example, the information Q may be RSRP, RSRQ, RSSI, etc., between the device 10A and the terminal 20, between the device 10A and another device 10A, or between the device 10A and the device 10B.
2) May be information related to location as illustrated in FIG. 10. For example, the information Q may be: GNSS information; longitude and latitude; altitude; area forming angle; or information indicating one of predetermined sections in a case where a plane is divided into the predetermined sections (zones).
3) May be a signal to be received or measured. For example, the information Q may be a type, a sequence, an ID, or a resource of the signal.
4) May be information related to a transmission signal. For example, the information Q may be information related to a signal: between the device 10A and the terminal 20; between the device 10A and the device 10A; or between the device 10A and the device 10B, wherein the signal is used for obtaining predetermined information that is to be transmitted from the device 10A to the device 10B in step S202. In addition, the information Q may be a type, a sequence, an ID, a frequency, a resource, transmission power, or a beam (information related to TCI (Transmission Configuration Indicator) state or QCL (Quasi co-location)) of the signal.
5) May be information related to another device 10A. For example, the information Q may be a location, a frequency, a resource, transmission power, etc.

The device 10A may report the received information Q to an upper layer. For example, the report may be reported to, but not limited to, any one of the MAC layer, the RRC layer, the RLC layer, the PDCP layer, and the SDAP layer. In addition, the report may be reported to any layer higher than the PHY layer, and may be performed to an application layer. The device 10A may have a function of displaying information based on the information Q in a predetermined screen. For example, the displaying function may be a function of performing indication to a user, may be an indication via voice, or may be an indication in which a predetermined indicator light is turned ON or is blinking.

The device 10A may perform a control related to transmission and/or reception of the device itself, based on the received information Q. The transmission may be related to a signal (for example, a broadcast signal and/or a reference signal from the device 10A, or a transmission signal and/or a reference signal from each terminal 20) related to each type of state reporting, or may be a signal transmission in a case of operating as the function X. The control may be changing of service conditions (for example, service type, communication requirements, coverage area, the number of devices to be accommodated, communication time, data amount, the degree of achievement with respect to the request, or the like). The control may be changing of a parameter to be used for transmission, and the changing of a parameter may be related to a type, a sequence, an ID, frequency, a resource, transmission power reduction, or beam (TCI state, QCL) limitation.

After the C-AP is installed based on the information Q, the device 10A may transmit a response completion signal to the device 10B. In a case where the device 10A detects that a condition based on the information Q is satisfied, the device 10A may transmit the response completion signal to the device 10B. For example, in a case where a predetermined propagation characteristic measurement value is greater than or is less than a threshold value in a predetermined time period, the device 10A may transmit the response completion signal to the device 10B. After the response completion signal is transmitted to the device 10B, an operation related to enabling or disabling or updating the function X may be applied to the device 10A. In addition, after the response completion signal is transmitted to the device 10B, the device 10A may receive an acknowledgment from the device 10B and may enable the function X in response to the reception of the acknowledgment.

According to the above-described embodiment, the device 10A that is going to be a C-AP can obtain a condition for enabling the function X, and the owner of the device 10A can install the device 10A with an appropriate method.

Figure 11:
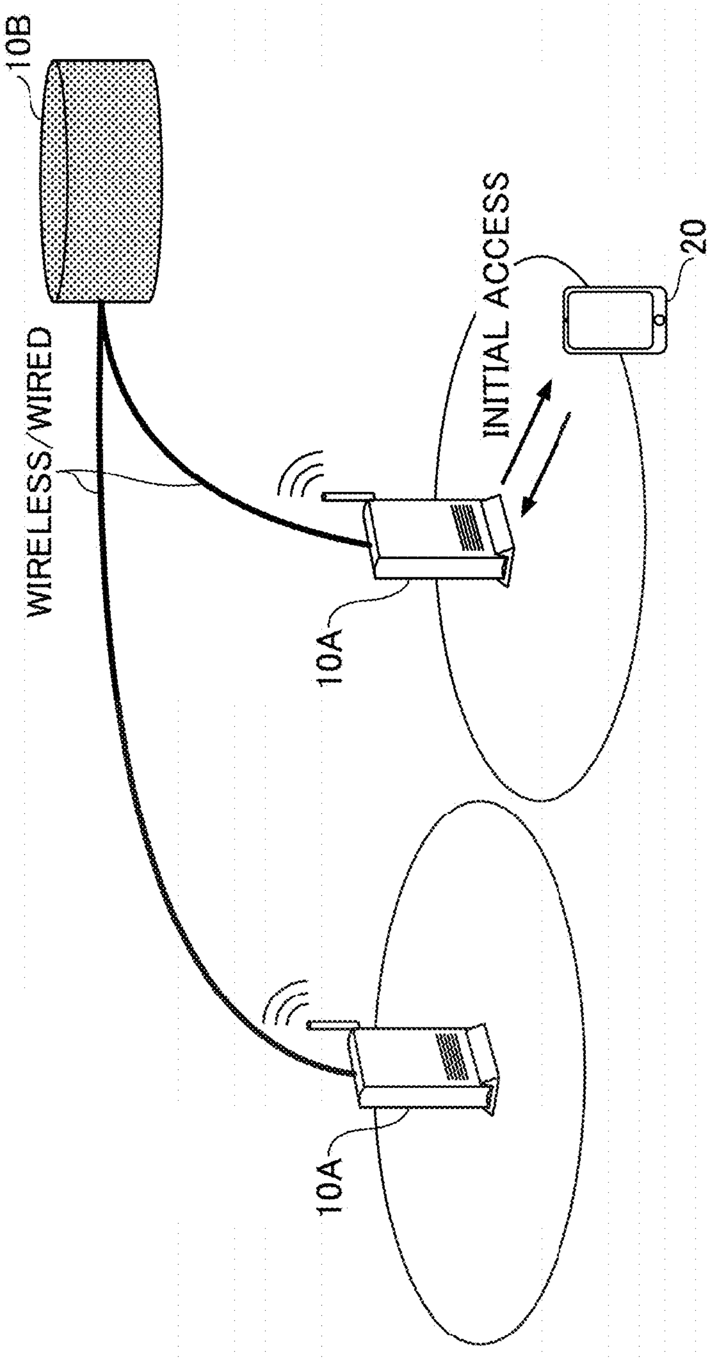
FIG. 11 is a drawing illustrating an example (1) of initial access in an embodiment of the present invention.

FIG. 11 is a drawing illustrating an example (1) of initial access in an embodiment of the present invention. As illustrated in FIG. 11, communications related to connection may be performed between the device 10A that is performing the function X and the terminal 20. The connection establishment may be performed between the device 10A and the terminal 20, and the connection establishment may be performed between the device 10B and the terminal 20 via the device 10A.

Figure 12:
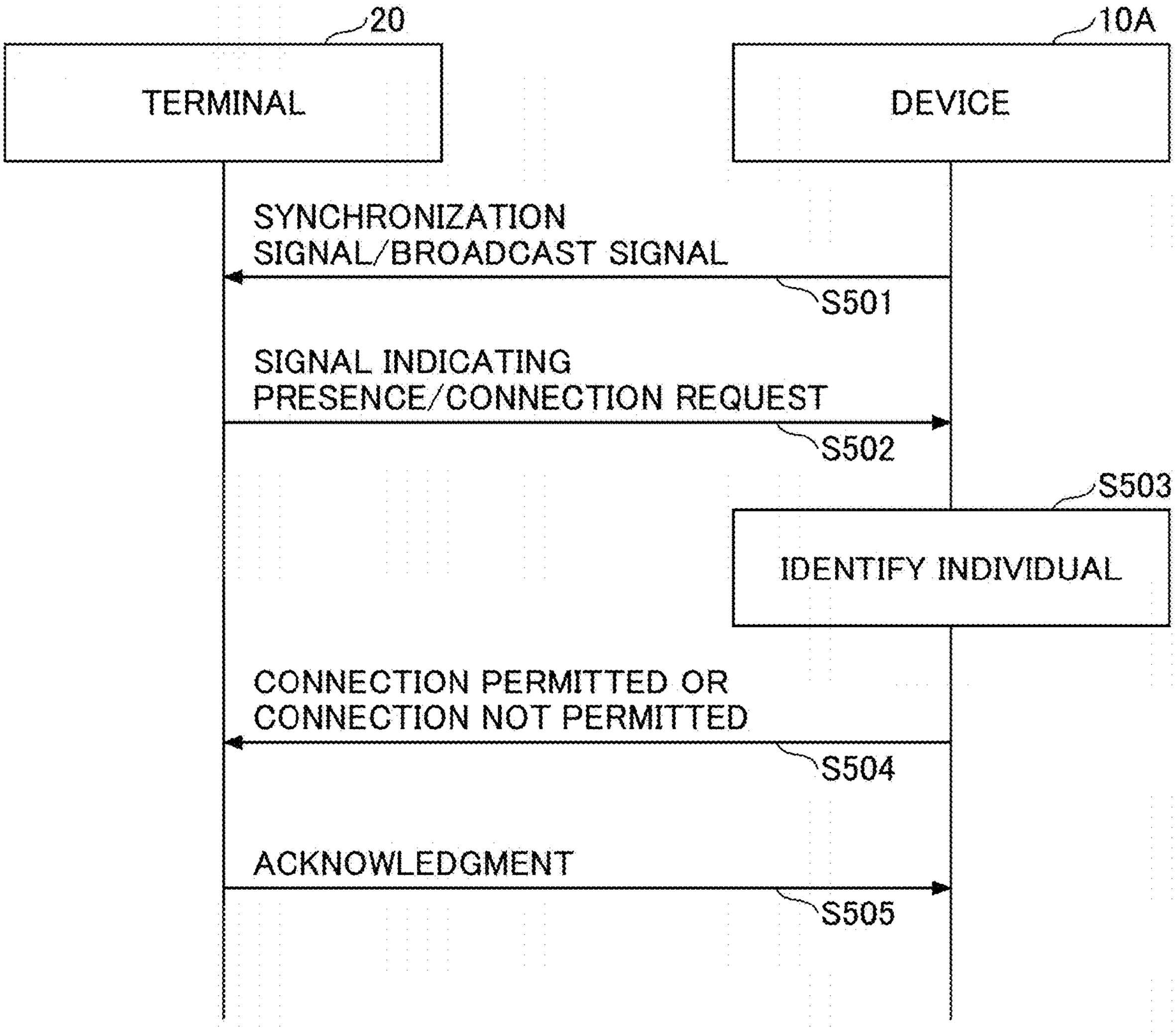
FIG. 12 is a sequence diagram illustrating an example (2) of initial access in an embodiment of the present invention.

FIG. 12 is a sequence diagram illustrating an example (2) of initial access in an embodiment of the present invention. FIG. 12 is a sequence diagram illustrating the connection establishment between the device 10A and the terminal 20. Note that some of the steps from step S501 to step S505 illustrated in FIG. 12 are not required to be performed.

In step S501, the device 10A transmits a synchronization signal and a broadcast signal to the terminal 20. For example, step S501 may correspond to transmission and reception of SSB (SS/PBCH block) and SIB. In subsequent step S502, the terminal 20 transmits a signal indicating its presence or a connection request to the device 10A. For example, step S502 may correspond to transmission and reception of PRACH, RAR (Random Access Response) and Msg3. In subsequent step S503, the device 10A identifies an individual, based on the signal from the terminal 20.

In subsequent step S504, the device 10A transmits a signal indicating connection permitted and/or completed, or connection not permitted, to the terminal 20. Step S504 may correspond to transmission and reception of Msg4. In subsequent step S505, the terminal 20 transmits an acknowledgment to the device 10A after receiving the signal related to connection permitted and/or completed. Step S505 may correspond to transmission and reception of ACK. The connection may be determined to be established between the device 10A and the terminal 20 when steps up to step S505 are completed.

In a case where connection establishment is performed between the device 10A and the terminal 20, that is, in a case where a UL-CCCH (Common Control Channel) message (for example, an RRC Setup Request), a DL-CCCH message (RRC Setup), and a UL-DCCH (Dedicated Control Channel) message (for example, an RRC Setup complete) are transmitted and received between the device 10A and the terminal 20, information related to the terminal 20 may be transmitted from the device 10A to the device 10B in the above-described initial access. In addition, information related to the connection permission or disapproval may be transmitted from the device 10B to the device 10A. The device 10A may perform step S504 based on the information.

Figure 13:
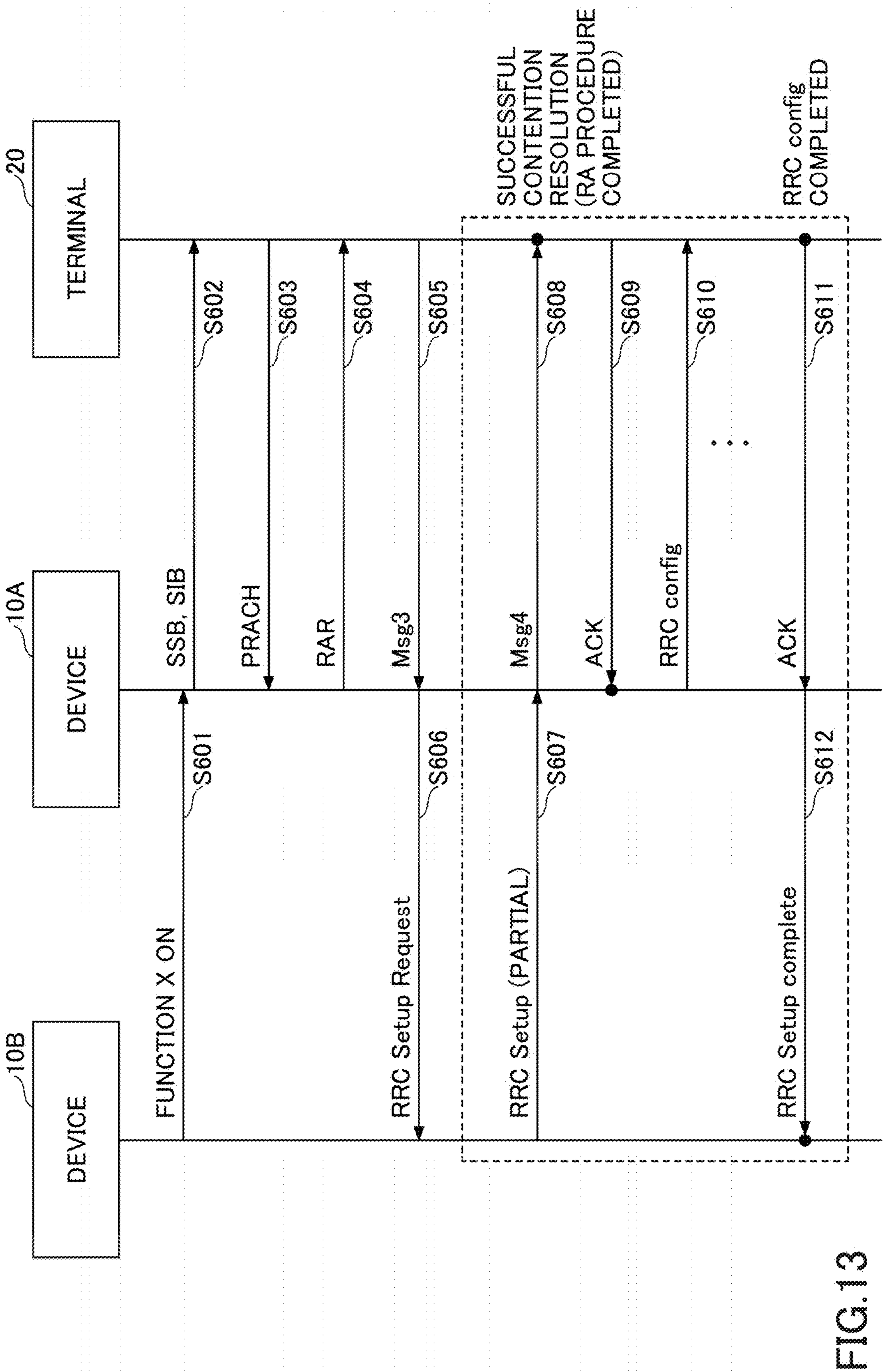
FIG. 13 is a sequence diagram illustrating an example (3) of initial access in an embodiment of the present invention.

FIG. 13 is a sequence diagram illustrating an example (3) of initial access in an embodiment of the present invention. In FIG. 13, the connection establishment is performed between the device 10B and the terminal 20 via the device 10A. In a case where connection establishment is performed between the device 10B and the terminal 20, that is, in a case where a UL-CCCH message (for example, an RRC Setup Request), a DL-CCCH message (RRC Setup), and a UL-DCCH message (for example, an RRC Setup complete) are transmitted and received between the device 10B and the terminal 20, the device 10A may transmit information related to contention resolution (for example, Msg4) to the terminal 20 after information related to the connection establishment (for example, RRC Setup) is all received.

In step S601, the device 10B transmits an indication for enabling the function X to the device 10A. In subsequent step S602, the device 10A transmits a synchronization signal and a broadcast signal (for example, SSB and SIB) to the terminal 20. In subsequent step S603, the terminal 20 transmits a PRACH to the device 10A. In subsequent step S604, the device 10A transmits an RAR to the terminal 20. In subsequent step S605, the terminal 20 transmits a Msg3 to the device 10A. In subsequent step S606, the device 10A transmits an RRC Setup Request based on the received Msg3 to the device 10B. Note that PRACH, RAR and Msg3 are not limited to PRACH, RAR and Msg3, and may be a signal indicating its presence to the device 10A from the terminal 20, or may be transmission or reception related to the connection request.

In subsequent step S607, the device 10B transmits an RRC Setup (the entirety, that is, the entire information related to the connection establishment) to the device 10A. In subsequent step S608, the device 10A transmits a Msg4 based on the received RRC Setup to the terminal 20. Note that the RRC Setup and Msg4 are not limited to the RRC Setup and Msg4, and may be any signal indicating connection permission and/or completion or disapproval to connect to the terminal 20. The random access procedure is completed with a successful contention resolution in step S608. In subsequent step S609, the terminal 20 transmits an ACK to the device 10A. In subsequent step S610, the device 10A transmits an RRC configuration to the terminal 20. Step S610 may be repeated with respect to the required RRC configuration. In step S611, the terminal 20 transmits an ACK to the device 10A. In subsequent step S612, the device 10A transmits an RRC Setup complete to the device 10B. The RRC configuration is completed in step S612.

Here, the service type or service requirements may be indicated via SSB, SIB or RAR. In addition, a TC-RNTI (Temporary Cell-Radio Network Temporary Identifier), a UL grant, or a TA (Timing Advance) command may be indicated via RAR. The TC-RNTI may be indicated from the device 10B to the device 10A at the time of enabling the function X, or may be indicated during the time between PRACH and RAR. In addition, interference level reporting may be performed via Msg3 (MAC-PDU (Protocol data unit)). In addition, information included in the RRC Setup and information included the RRC configuration may be entirely or partially the same, or may be different.

Figure 14:
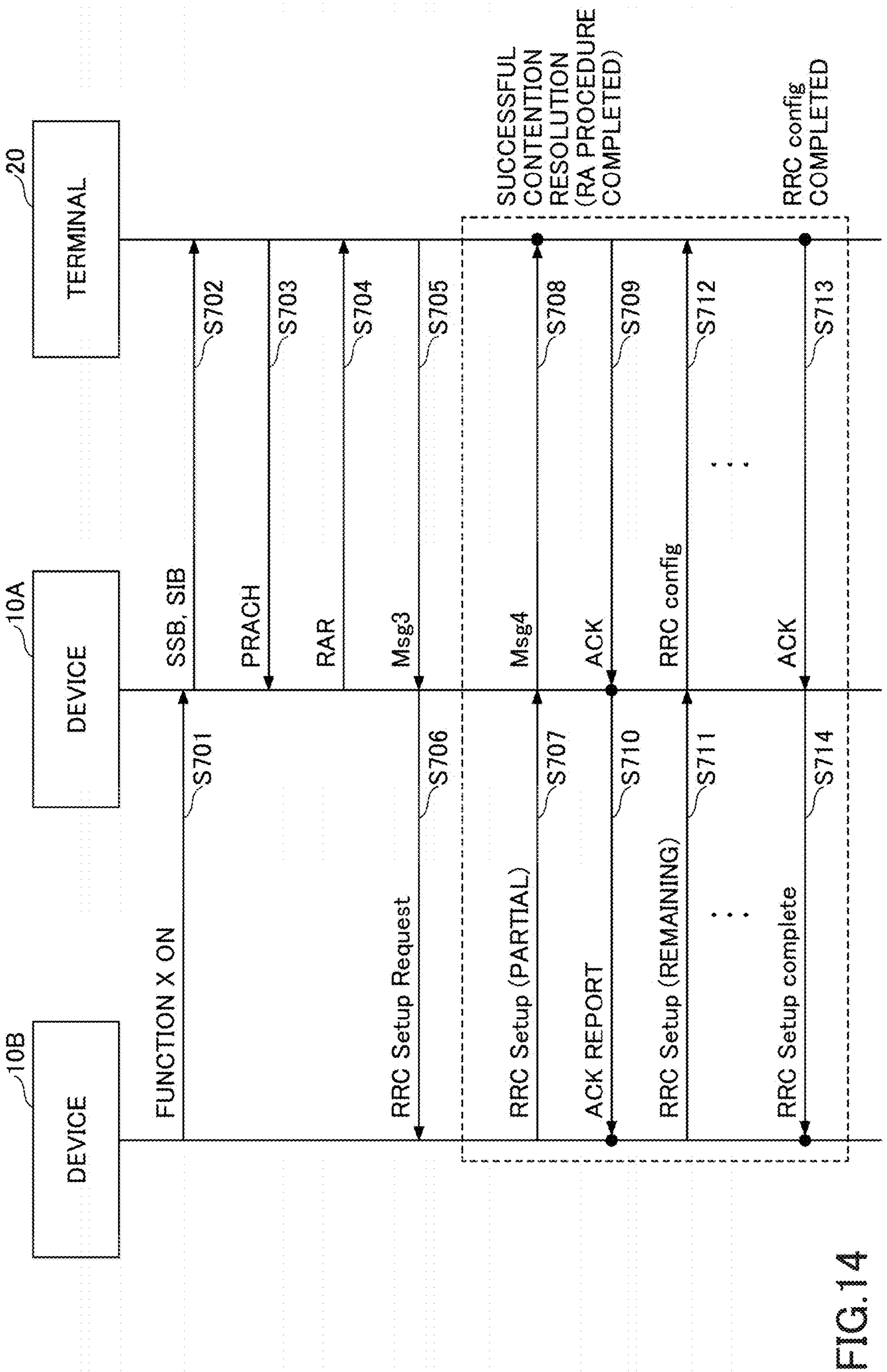
FIG. 14 is a sequence diagram illustrating an example (4) of initial access in an embodiment of the present invention.

FIG. 14 is a sequence diagram illustrating an example (4) of initial access in an embodiment of the present invention. In FIG. 14, the connection establishment is performed between the device 10B and the terminal 20 via the device 10A. In a case where connection establishment is performed between the device 10B and the terminal 20, that is, in a case where a UL-CCCH message (for example, an RRC Setup Request), a DL-CCCH message (RRC Setup), and a UL-DCCH message (for example, an RRC Setup complete) are transmitted and received between the device 10B and the terminal 20, the device 10A may transmit information related to contention resolution (for example, Msg4) to the terminal 20 at the time when information related to the connection establishment (for example, RRC Setup) is at least partially received. Note that, in a case where the connection establishment is performed between the device 10B and the terminal 20 via the device 10A, the procedure related to the initial access illustrated in FIG. 13 may be performed, or the procedure related to the initial access illustrated in FIG. 14 may be performed In step S701, the device 10B transmits an indication for enabling the function X to the device 10A. In subsequent step S702, the device 10A transmits a synchronization signal and a broadcast signal (for example, SSB and SIB) to the terminal 20. In subsequent step S703, the terminal 20 transmits a PRACH to the device 10A. In subsequent step S704, the device 10A transmits an RAR to the terminal 20. In subsequent step S705, the terminal 20 transmits a Msg3 to the device 10A. In subsequent step S706, the device 10A transmits an RRC Setup Request based on the received Msg3 to the device 10B. Note that PRACH, RAR and Msg3 are not limited to PRACH, RAR and Msg3, and may be a signal indicating its presence to the device 10A from the terminal 20, or may be transmission or reception related to the connection request.

In subsequent step S707, the device 10B transmits an RRC Setup (the partial, that is, the partial information related to the connection establishment) to the device 10A. In subsequent step S708, the device 10A transmits a Msg4 based on the received RRC Setup to the terminal 20. Note that the RRC Setup and Msg4 are not limited to the RRC Setup and Msg4, and may be any signal indicating connection permission and/or completion or disapproval to connect to the terminal 20. The random access procedure is completed with a successful contention resolution in step S708. In subsequent step S709, the terminal 20 transmits an ACK to the device 10A. In subsequent step S710, the device 10A transmits an ACK report to the device 10B. In subsequent step S711, the device 10B transmits an RRC Setup (that is, the remaining information related to the connection establishment) to the device 10A. In subsequent step S712, the device 10A transmits an RRC configuration to the terminal 20. Step S711 and step S712 may be repeated with respect to the required RRC configuration. In step S713, the terminal 20 transmits an ACK to the device 10A. In subsequent step S714, the device 10A transmits an RRC Setup complete to the device 10B. The RRC configuration is completed in step S714.

Here, the service type or service requirements may be indicated via SSB, SIB or RAR. In addition, a TC-RNTI, a UL grant, or a TA command may be indicated via RAR. The TC-RNTI may be indicated from the device 10B to the device 10A at the time of enabling the function X, or may be indicated during the time between PRACH and RAR. In addition, interference level reporting may be performed via Msg3 (MAC-PDU). In addition, the ACK report may be performed via PUCCH or PUSCH (MAC-PDU). In addition, information included in the RRC Setup and information included the RRC configuration may be entirely or partially the same, or may be different.

Figure 15:
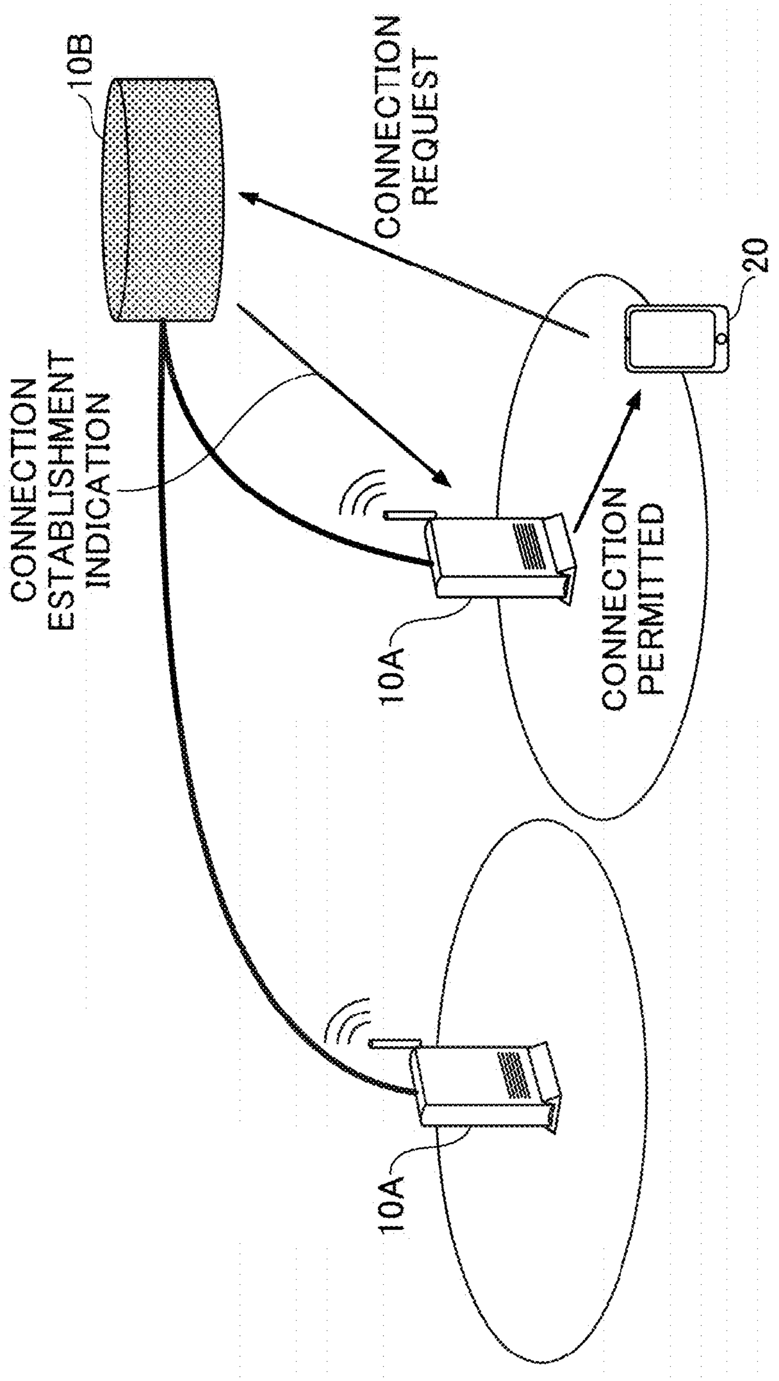
FIG. 15 is a diagram illustrating an example (5) of initial access in an embodiment of the present invention.

FIG. 15 is a drawing illustrating an example (5) of initial access in an embodiment of the present invention. As illustrated in FIG. 15, a signal related to the connection permission or completion may be transmitted from the device 10A to the terminal 20, based on a signal transmitted from the device 10B to the device 10A.

First, the device 10A and the terminal 20 are connected to the device 10B. Subsequently, the terminal 20 transmits, to the device 10B, a request for connection to the device 10A. Subsequently, the device 10B transmits, to the device 10A, an indication or a request for establishing connection with the terminal 20. Subsequently, the device 10A transmits a signal indicating connection permitted or completed, or connection not permitted, to the terminal 20. Subsequently, the terminal 20 transmits an acknowledgment to the device 10A and/or the device 10B after the reception of the signal related to connection permitted or completed.

Figure 16:
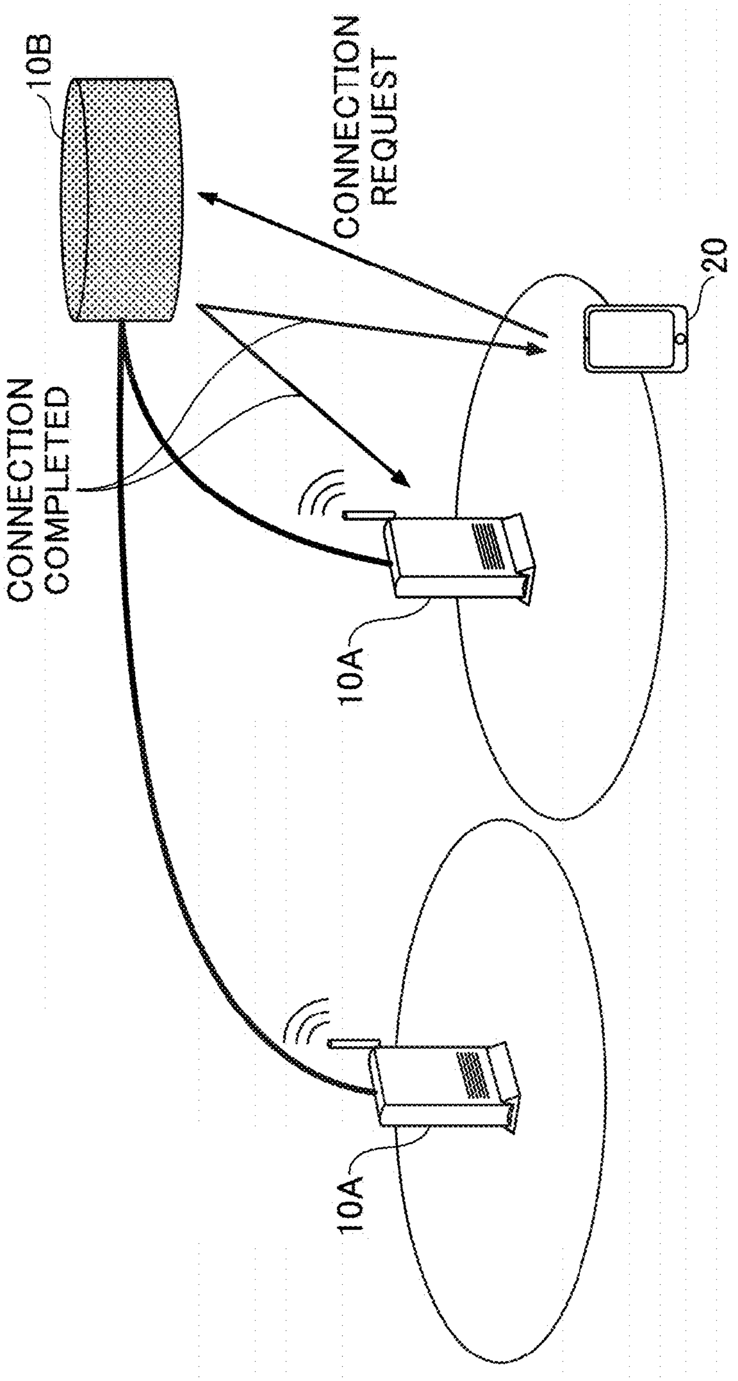
FIG. 16 is a diagram illustrating an example (6) of initial access in an embodiment of the present invention.

FIG. 16 is a drawing illustrating an example (6) of initial access in an embodiment of the present invention. As illustrated in FIG. 16, a signal related to the connection permission or completion may be transmitted from the device 10B to the device 10A and the terminal 20, based on a signal transmitted from the device 10B to the terminal 20.

First, the device 10A and the terminal 20 are connected to the device 10B. Subsequently, the terminal 20 transmits, to the device 10B, a request for connection to the device 10A. Subsequently, the device 10B transmits a signal indicating connection permitted or completed, or connection not permitted, to the device 10A and the terminal 20. Subsequently, the terminal 20 transmits an acknowledgment to the device 10A and/or the device 10B after the reception of the signal related to connection permitted or completed.

In the communication related to the connection between the device 10A that is performing the function X and the terminal 20, the following information may be included in a signal transmitted from the device 10A. For example: PLMN information; capability of the device 10A related to the communication control of the terminal 20; capability of the terminal 20 that can be supported by the device 10A;

service type to be provided; achievable communication requirements; frequency to be provided; device group that can be accommodated; the number of terminals 20 that can be accommodated; the number of terminals 20 that have already been accommodated; the status of resource utilization; or the like, may be included. The destination of the signal may be another device 10A, may be the device 10B, or may be transmitted to the terminal 20.

In the communication related to the connection between the device 10A that is performing the function X and the terminal 20, the following information may be included in a signal transmitted from the terminal 20. For example: PLMN information; capability of the terminal 20 itself; service type to be requested; communication requirements; frequency to be supported; device group; or the like, may be included. The destination of the signal may be the device 10A, may be the device 10B, or may be another terminal 20.

The terminal 20 may be enabled to transmit the connection request to the device 10A and/or the device 10B only in a case where a predetermined condition is satisfied. The predetermined condition may be a condition based on information related to the synchronization signal and/or the broadcast signal received from the device 10A. For example, the information may be: PLMN information; capability; service type; device group; location of the device 10A or the terminal 20; altitude of the device 10A or the terminal 20; or RSRP, RSRQ, RSSI, a distance, or the like, between the device 10A and the terminal 20. In addition, the predetermined condition may be, for example, that the terminal 20 is to be included in the device group indicated by the synchronization signal and/or the broadcast signal.

The device 10A may be enabled to transmit the indication of the connection permission or completion to the terminal 20 only in a case where a predetermined condition is satisfied. In a case where the predetermined condition is not satisfied, an indication of connection not permitted may be transmitted to the terminal 20. The predetermined condition may be a condition based on information in a signal received from the terminal 20. The information may be, for example: PLMN information; capability of the device itself; service type to be requested; communication requirements; frequency that can be supported; device group; location of the device 10A or the terminal 20; altitude of the device 10A or the terminal 20; or RSRP, RSRQ, RSSI, a distance, or the like, between the device 10A and the terminal 20. In addition, for example, in a case where the service type that is requested by the terminal 20 can be provided by the device 10A, the device 10A may transmit the connection permission or completion to the terminal 20. In addition, for example, in a case where the connection permission signal is not received within a predetermined time from the device 10A, the terminal 20 may assume that the connection to the device 10A is not permitted.

An operation related to the connection termination (end of connection) may be performed between the device 10A and the terminal 20. For example, the device 10A may indicate the connection termination to the terminal 20. For example, the terminal 20 may indicate the connection termination to the device 10A. For example, the terminal 20 may indicate the connection termination to the device 10B. For example, the device 10A may indicate the connection termination to the device 10B.

Predetermined information may be indicated according to the indication of the connection termination. For example, the predetermined information may be the time until the connection termination.

The connection termination may be indicated in a case where a predetermined condition is satisfied. For example, the connection termination may be indicated in a case where no transmission data becomes available, or in a case where a certain amount of time has elapsed after no transmission data becomes available.

A response may be transmitted in response to the reception of the connection termination indication. In a case where the response is an ACK, the connection termination may be permitted. In a case where the response is a NACK, the connection termination is not required to be permitted and the connection may be maintained.

According to the above-described embodiment, a communication counterpart for performing the desired service can be determined, and the communication establishment for performing the service is enabled.

The terminal 20 may perform communications with a plurality of devices 10A. The plurality of devices 10A that perform communication with a terminal 20 may be determined according to one of methods described in 1) to 3) below.

Figure 17:
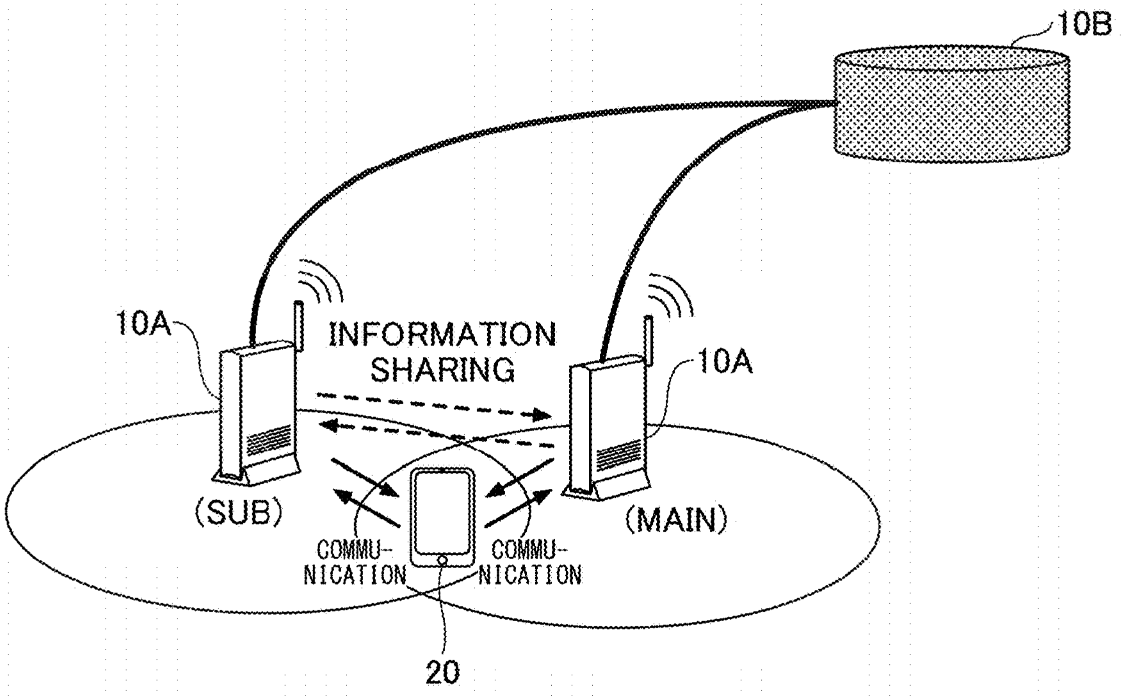
FIG. 17 is a drawing illustrating an example (1) of connecting to a plurality of devices in an embodiment of the present invention.

1) FIG. 17 is a drawing illustrating an example (1) of connecting to a plurality of devices in an embodiment of the present invention. As illustrated in FIG. 17, a device 10A that is to communicate with the terminal 20 may be determined by the device 10A, based on information sharing between devices 10A. A main-device 10A may be determined, and the terminal 20 may be connected to the main-device 10A. The main-device 10A may share information with other devices 10A to determine a sub-device 10A that is to communicate with the terminal 20. The main-device 10A may add or delete the sub-device 10A. The main-device 10A may be changed in accordance with handover. That is, the handover-destination device 10A may be changed to the main-device 10A. The wireless or wired interface may be specified for sharing information between devices 10A.

Figure 18:
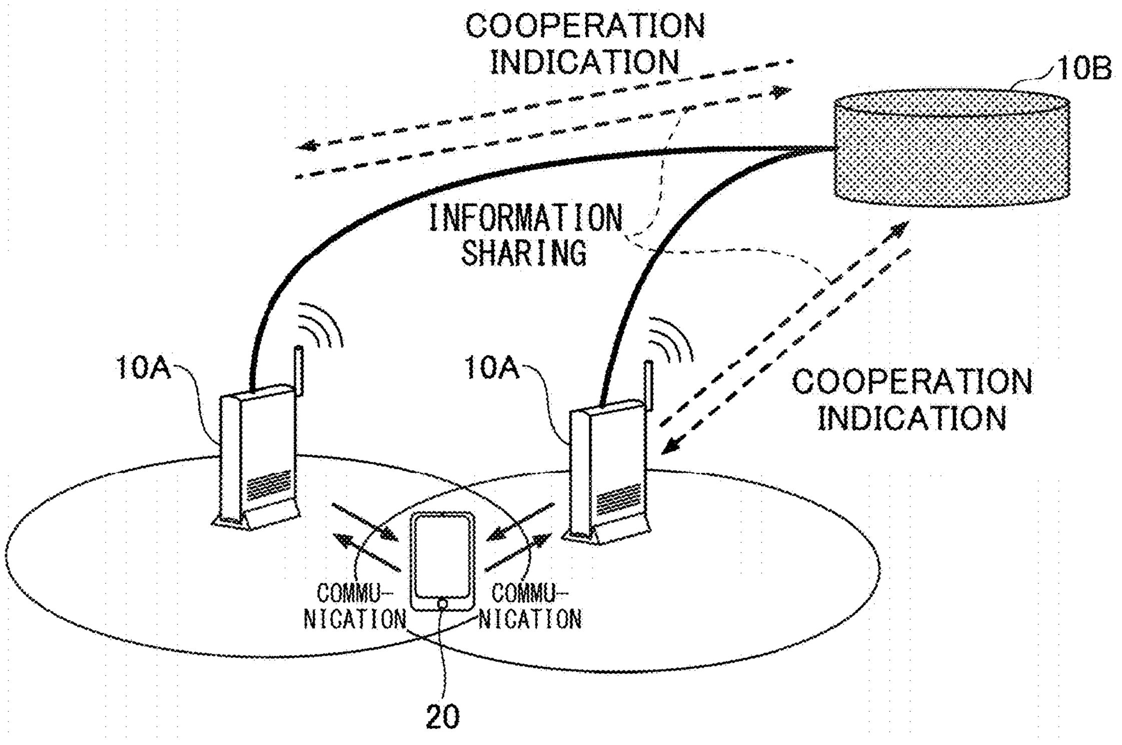
FIG. 18 is a drawing illustrating an example (2) of connecting to a plurality of devices in an embodiment of the present invention.

2) FIG. 18 is a drawing illustrating an example (2) of connecting to a plurality of devices in an embodiment of the present invention. As illustrated in FIG. 18, the device 10A may share information with the device 10B, and a device 10A that is to communicate with the terminal 20 may be determined by the device 10B, based on the information. In other words, the device 10A may receive, from the device 10B, an indication related to the determination. The device 10A may report, to the device 10B, information related to the communication situation of the device 10A itself and to the connection situation of the terminal 20. The device 10A may request, to the device 10B, a permission to cooperate with a specific device 10A. The device 10A may receive from the device 10B: an indication of performing communication with respect to a terminal 20 by cooperating with a specific device 10A; and a parameter related to the communication. The device 10B may indicate a method of cooperation between a plurality of devices 10A to be described below. The device 10A may share, with the specific device 10A, information related to the cooperation. For example, the above-described method in the example (1) of connecting to a plurality of devices may be applied. The cooperation between the devices 10A may be performed with respect to all terminals 20 without being limited to a particular terminal 20.

Figure 19:
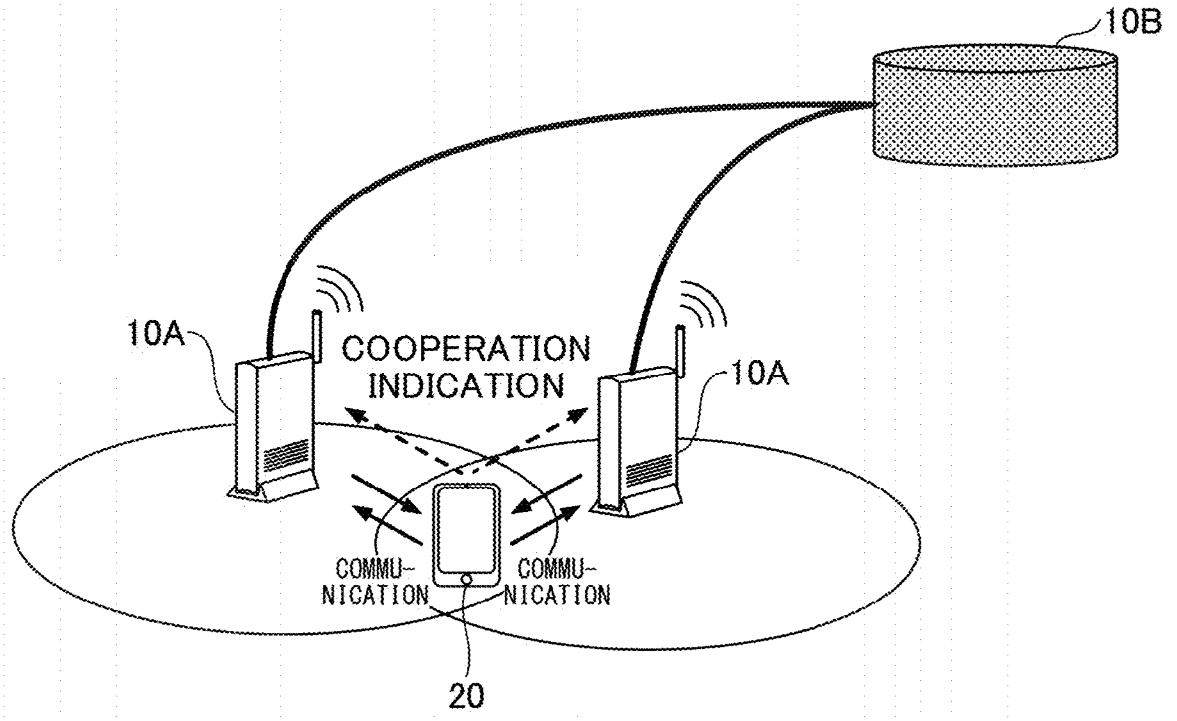
FIG. 19 is a drawing illustrating an example (3) of connecting to a plurality of devices in an embodiment of the present invention.

3) FIG. 19 is a drawing illustrating an example (3) of connecting to a plurality of devices in an embodiment of the present invention. As illustrated in FIG. 19, the terminal 20 may determine a plurality of devices 10A that perform communication with the terminal 20 from among the detectable devices 10A. The terminal 20 may transmit an indication of cooperation to a plurality of devices 10A, based on: the signal strength from each of the devices 10A; and information received from each of the devices 10A. The terminal 20 may transmit a report of information related to cooperation or a request for cooperation to the device 10B, and an indication of cooperation may be transmitted from the device 10B to the devices 10A, based on the report or the request. The terminal 20 may indicate a method of cooperation between a plurality of devices 10A described below. An indication related to a plurality of devices 10A that is transmitted from a terminal 20 may be applied to communications between another terminal 20 and the plurality of devices 10A. The communication for indicating cooperation to the devices 10A by the terminal 20 may be performed via a frequency for data transmission and reception (for example, serving cell, carrier, or the like), or may be performed via another frequency or a RAT.

Figure 20:
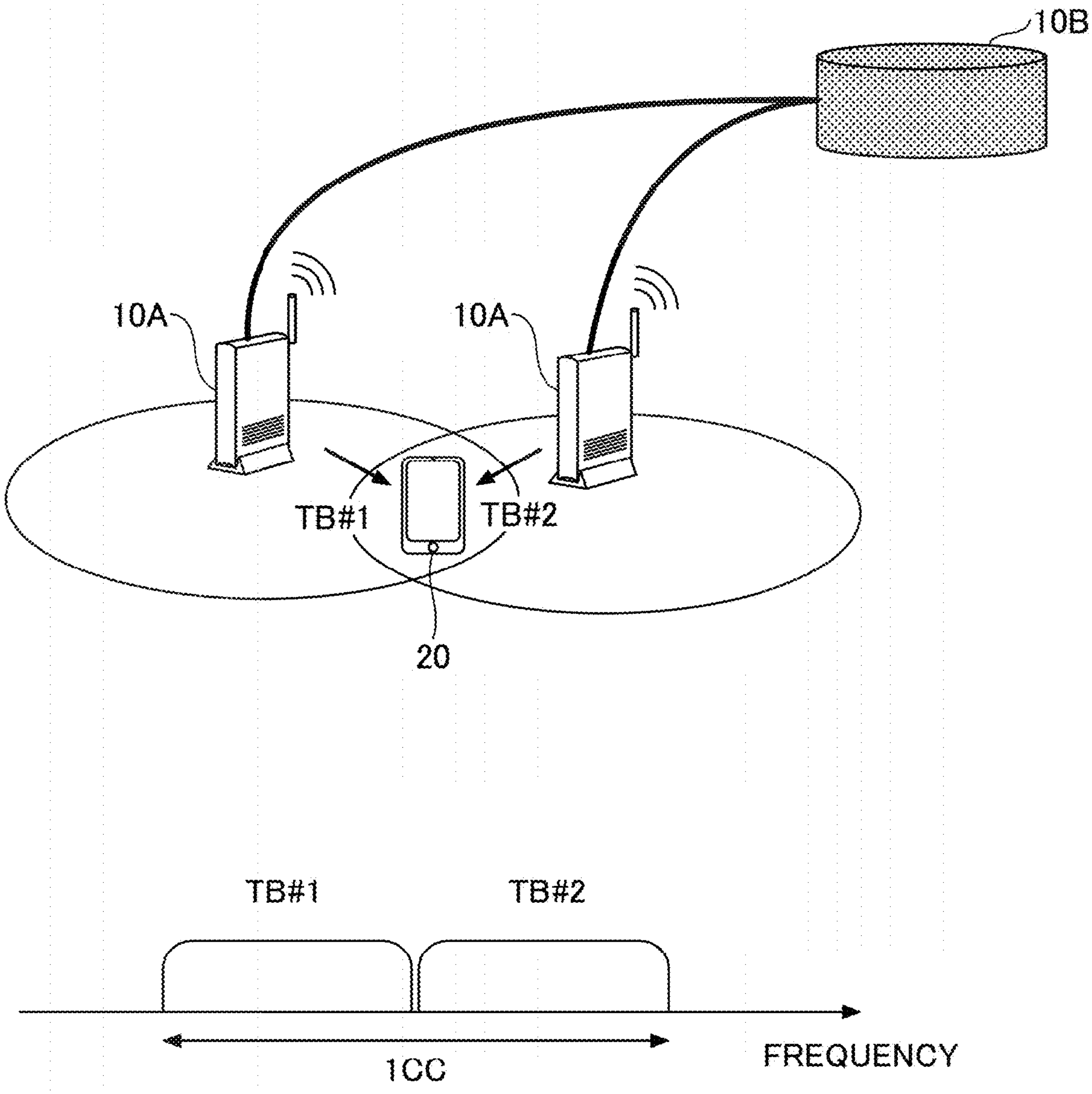
FIG. 20 is a drawing illustrating an example (4) of connecting to a plurality of devices in an embodiment of the present invention.

FIG. 20 is a drawing illustrating an example (4) of connecting to a plurality of devices in an embodiment of the present invention. As illustrated in FIG. 20, the plurality of devices 10A and the terminal 20 may perform data transmission and reception via the same frequency band (for example, serving cell, carrier, or the like). In other words, the configuration of multi-TRP (Transmission Reception Point) may be used.

Different data may be transmitted from the terminal 20 to each device 10A via the same frequency band, and different data may be transmitted from each device 10A to the terminal 20 via the same frequency band. In other words, as illustrated in FIG. 20, the transport block (TB) #1 and the TB #2 may be transmitted to the terminal 20 on one CC. The different data may be multiplexed according to one or more of TDM (Time division multiplexing), FDM (Frequency division multiplexing), SDM (Space division multiplexing), and CDM (Code division multiplexing). In addition, resource allocation information used for the transmission may be shared between each device 10A and the terminal 20. Control information may be transmitted to the terminal 20 from each device 10A, or may be transmitted together to the terminal 20 from a particular device 10A. The HARQ feedback for each device 10A may be performed with respect to each device 10A, or may be performed together with respect to a particular device 10A.

Figure 21:
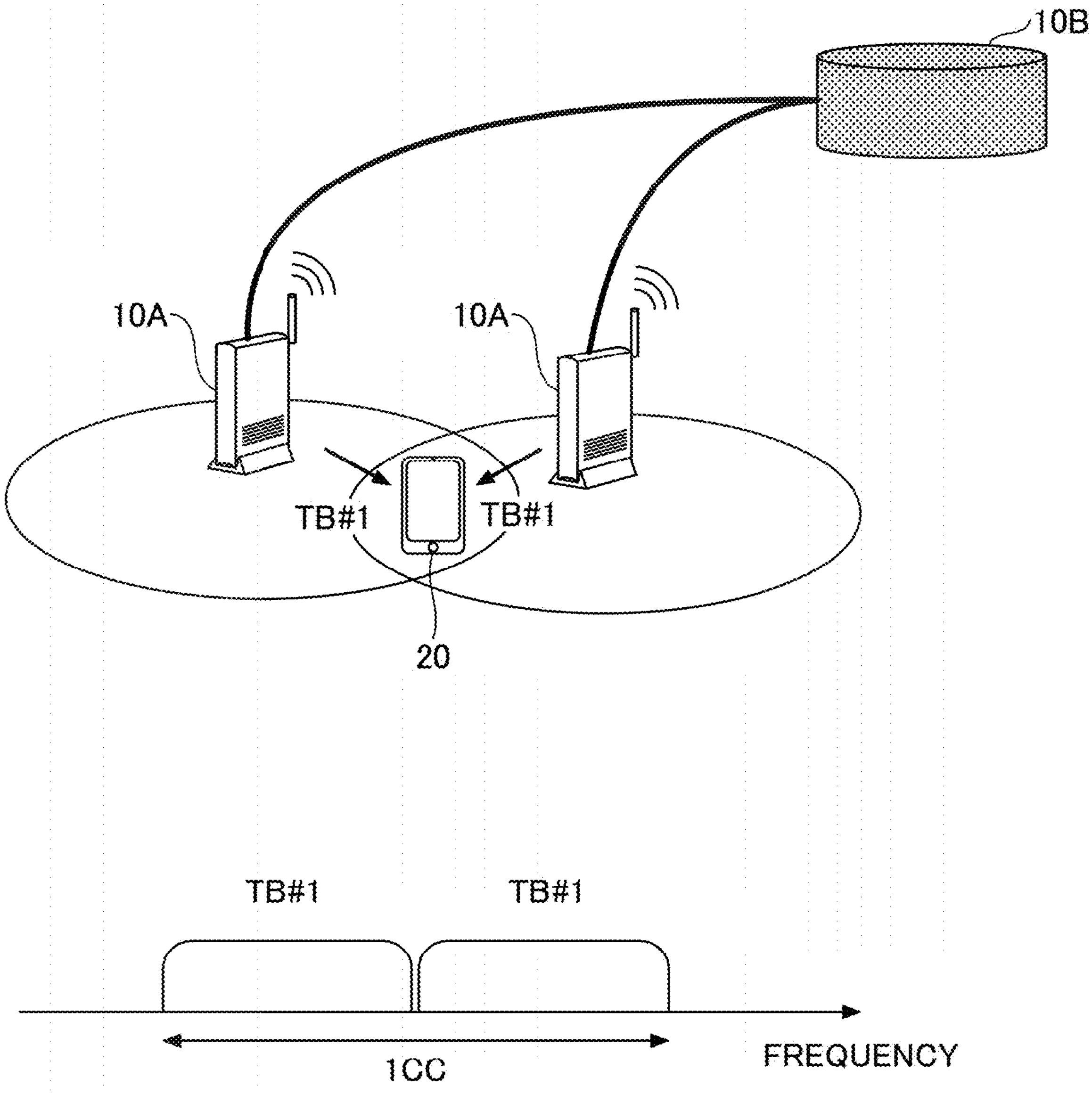
FIG. 21 is a drawing illustrating an example (5) of connecting to a plurality of devices in an embodiment of the present invention.

FIG. 21 is a drawing illustrating an example (5) of connecting to a plurality of devices in an embodiment of the present invention. As illustrated in FIG. 21, the plurality of devices 10A and the terminal 20 may perform data transmission and reception via the same frequency band (for example, serving cell, carrier, or the like). In other words, the configuration of multi-TRP (Transmission Reception Point) may be used.

The same data may be transmitted from the terminal 20 to each device 10A via the same frequency band, and the same data may be transmitted from each device 10A to the terminal 20 via the same frequency band. In other words, as illustrated in FIG. 21, the TB #1 and the TB #1 may be transmitted to the terminal 20 on one CC. The same data may be multiplexed according to one or more of TDM, FDM, SDM, and CDM. In addition, particular data may be transmitted from one device 10A to another device 10A, and may be transmitted to the terminal 20 from the one device 10A and the other device 10A. Control information may be transmitted to the terminal 20 from each device 10A, or may be transmitted together to the terminal 20 from a particular device 10A. The HARQ feedback for each device 10A may be performed with respect to each device 10A, or may be performed together with respect to a particular device 10A. The terminal 20 may determine data signals received from a plurality of devices 10A as a signal related to the same data, or may combine the received plurality of data signals to determine success or failure of reception or decoding.

Figure 22:
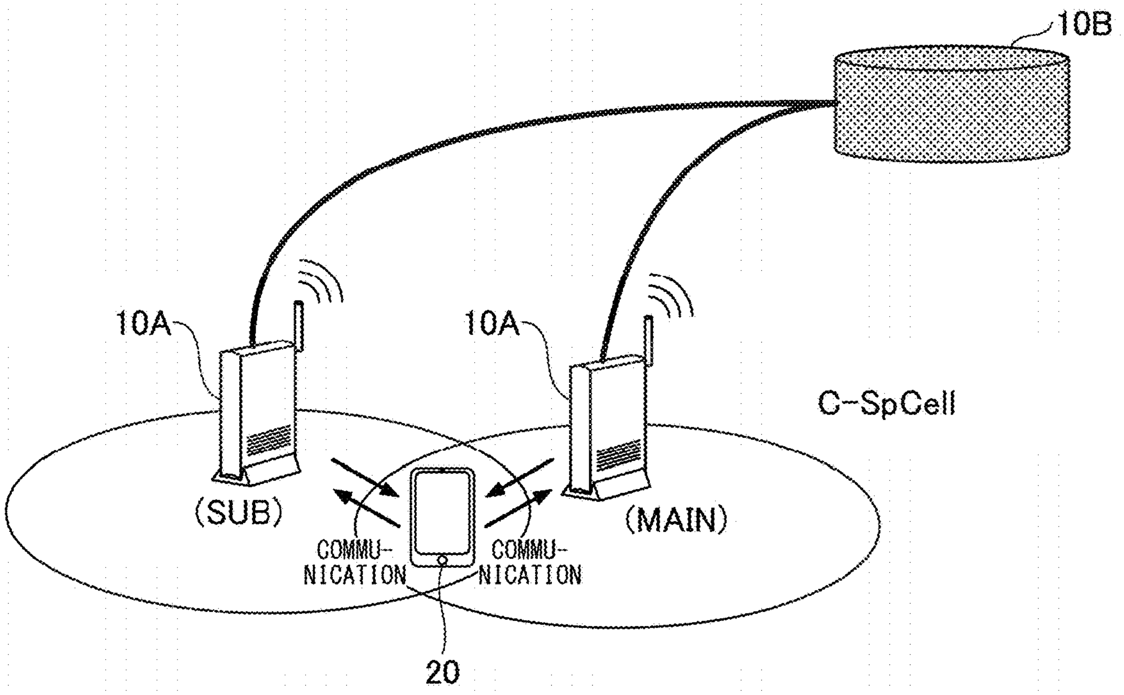
FIG. 22 is a drawing illustrating an example (6) of connecting to a plurality of devices in an embodiment of the present invention.

FIG. 22 is a drawing illustrating an example (6) of connecting to a plurality of devices in an embodiment of the present invention. The terminal 20 may perform data transmission and reception to and from a plurality of devices 10A via different frequency bands (for example, serving cell, carrier). In other words, carrier aggregation or dual connectivity may be performed via the plurality of devices 10A.

For example, in a case where a device 10A that communicates with the terminal 20 is determined by the device 10A, C-SpCell (Configurable Special Cell) illustrated in FIG. 22 may be determined by a main-device 10A. The SpCell may be a cell specified in the same way as the SpCell in NR. In a case where there are a plurality of cells formed by the main-device 10A, the C-SpCell may be determined by the device 10B or determined by the device 10A. In a case where the C-SpCell is determined by the device 10B, the C-SpCell may be indicated to the device 10A via an index of CC.

In a case where the C-SpCell is determined by the device 10A, the C-SpCell may be determined based on information of the terminal 20. For example, the C-SpCell may be determined to be a cell whose RSRP, RSRQ, or RSSI is the largest among cells formed by the terminal 20 and the device 10A, may be determined to be a cell that satisfies the buffer size of BSR (Buffer Status Report), or may be determined to be a cell that supports the service type or priority, or, the cell may be determined based on: the configurable band; band combination; FR (Frequency Range); UE type; UE category; capability; or connection situation.

In a case where the C-SpCell is determined by the device 10A, the C-SpCell may be determined based on CC information. The C-SpCell may be determined based on, for example: the number of PRBs; TDD configuration; service type to be supported; cell utilization rate, or the like. In addition, the device 10A may determine the C-SpCell to be a cell in which the number of connected devices is less than a threshold value K.

The device 10A may indicate the determined C-SpCell to the terminal 20. For example, the device 10A may implicitly perform the indication to the terminal 20 by transmitting a synchronization signal, or may explicitly perform the indication to the terminal 20 via PHY signaling, MAC signaling, RRC signaling, or the like. The PHY signaling may be a DCI field, a DCI format, a CORESET, a search space (SS), or a scrambling RNTI. The MAC signaling may be a MAC-CE. The RRC signaling may be an RRC parameter.

Figure 23:
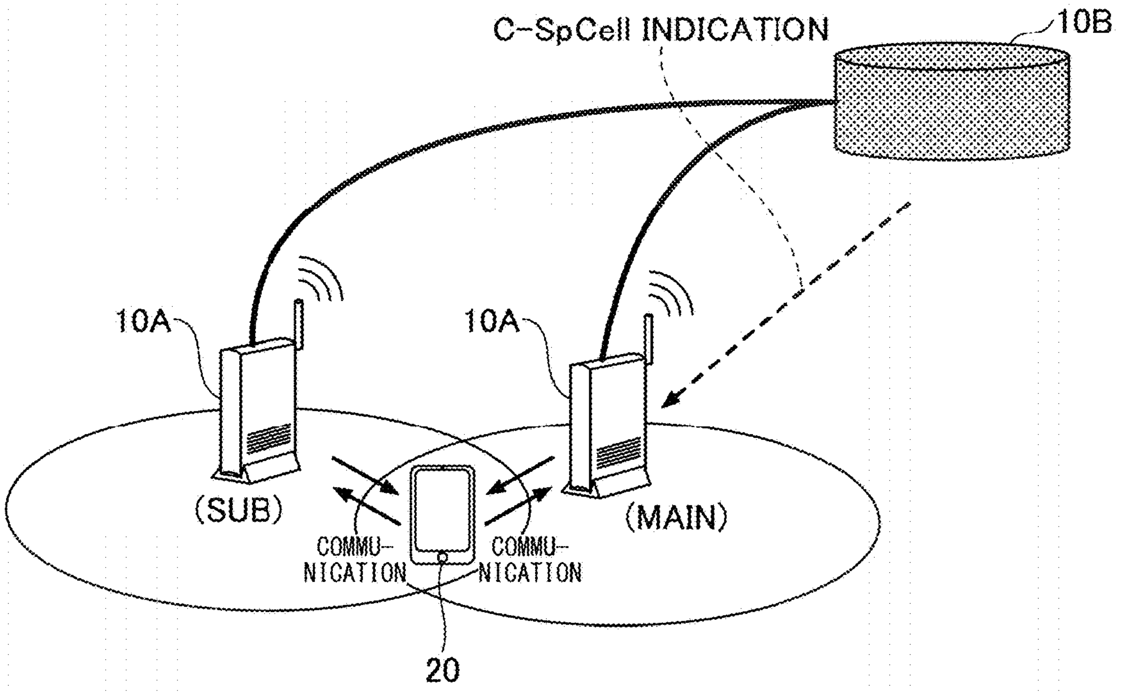
FIG. 23 is a drawing illustrating an example (7) of connecting to a plurality of devices in an embodiment of the present invention.

FIG. 23 is a drawing illustrating an example (7) of connecting to a plurality of devices in an embodiment of the present invention. For example, in a case where a device 10A that communicates with the terminal 20 is determined by the device 10B, the C-SpCell illustrated in FIG. 23 may be determined by the device 10B. The device 10A may receive an indication indicating which cell is to be the C-SpCell from the device 10B, or the indication may be performed by the device 10B via a CC index. For example, in a case where the C-SpCell is to be determined by a device 10A, information indicating which device 10A is to determine the C-SpCell may be indicated from the device 10B to the device 10A. In a case where the C-SpCell is to be determined by a device 10A, the method illustrated in FIG. 22 may be applied.

Figure 24:
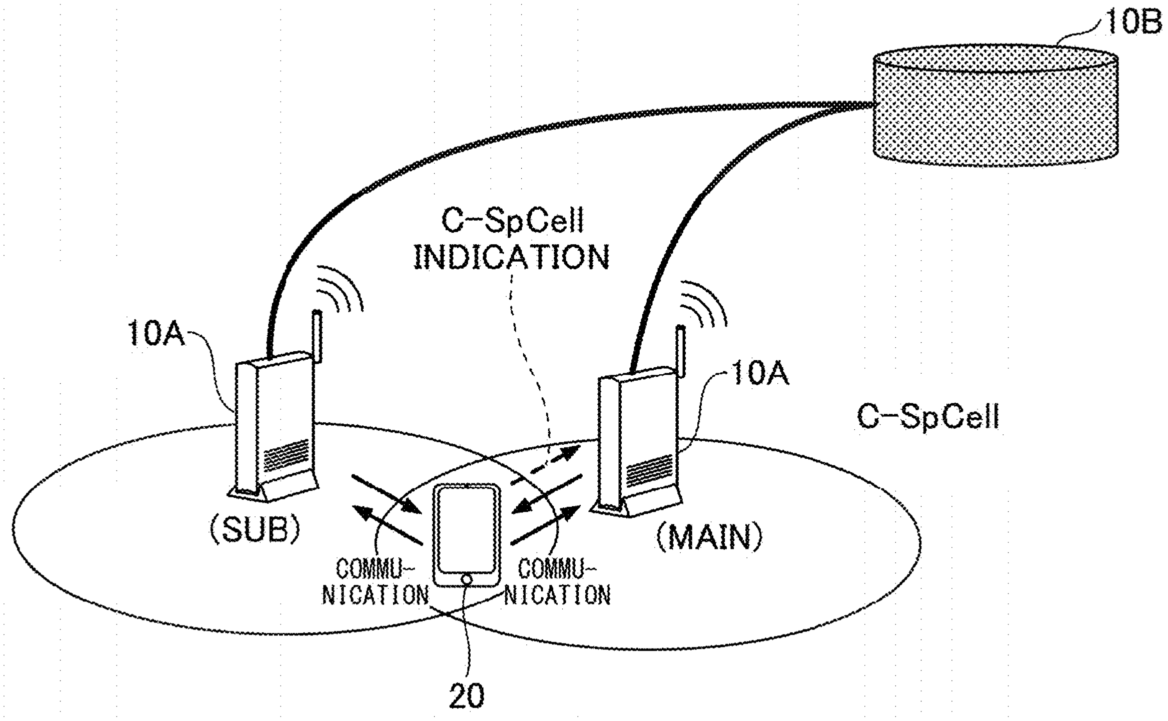
FIG. 24 is a drawing illustrating an example (8) of connecting to a plurality of devices in an embodiment of the present invention.

FIG. 24 is a drawing illustrating an example (8) of connecting to a plurality of devices in an embodiment of the present invention. For example, in a case where a device 10A that communicates with the terminal 20 is determined by the terminal 20, the C-SpCell illustrated in FIG. 24 may be determined by the terminal 20. In a case where the C-SpCell is to be determined by the terminal 20, the C-SpCell may be determined based on the connection order of the terminal 20. In addition, in a case where the C-SpCell is to be determined by the terminal 20, the C-SpCell may be determined based on information from the device 10A. The information may be: RSRP; RSRQ; RSSI; transmission buffer size; configurable band/band combination/FR; UE type; UE category; capability; the number of PRBs; TDD configuration; service type to be supported; cell utilization rate; or the like.

In a case where the C-SpCell is to be determined by the terminal 20, the determined C-SpCell may be indicated to the device 10A. For example, the indication to the device 10A may be explicitly performed by PHY signaling, MAC signaling, RRC signaling, or the like. The PHY signaling may be a DCI field, a DCI format, a CORESET, an SS, or a scrambling RNTI. The MAC signaling may be a MAC-CE. The RRC signaling may be an RRC parameter. The C-SpCell may be determined by a device 10A or a device 10B, and the method illustrated in FIG. 22 or FIG. 23 may be applied.

A method of addition or control related to C-SCell may be one of 1) to 5) described below. The C-SCell may be a cell specified in the same way as the SCell in NR.

1) Activation or deactivation may be explicitly indicated via signaling such as PHY, MAC or RRC, from the device 10A to the terminal 20, from the terminal 20 to the device 10A, or from the device 10B to the device 10A and the terminal 20. In other words, any one of the device 10A, the device 10B and the terminal 20 may determine whether the C-SCell is to be added.
2) C-SCell that is formed by the device 10A that forms the C-SCell may be always active.
3) Activation or deactivation of C-SCell may be performed based on information between the device 10A and the terminal 20. For example, the C-SCell may be activated when RSRP, RSRQ, or RSSQ exceeds X dBm, or may be deactivated when RSRP, RSRQ, or RSSQ becomes less than Y dBm. In addition, the C-SCell may be activated in a case where Tx msec elapses after RSRP, RSRQ, or RSSQ exceeds X dBm, or may be deactivated in a case where Ty msec elapses after RSRP, RSRQ, or RSSQ becomes less than Y dBm. In addition, the C-SCell may be activated in a case where the BSR buffer size is equal to or greater than M (the buffer size level or index is equal to or greater than N), or may be deactivated in a case where the BSR buffer size is less than M.

In addition, the C-SCell may be activated in a case where communications of a specific service type or priority is required. In addition, the C-SCell may be activated or deactivated based on: the number of configurable CCs; band; band combination; FR; UE type; or UE category. In addition, the C-SCell may be activated or deactivated based on the UE capability or the connection situation (for example, the connection with another UE or gNB).

4) Activation or deactivation may be performed based on information of the C-SpCell and/or the C-SCell. For example, the C-SCell may be activated or deactivated based on: the number of PRBs; TDD configuration; service type to be supported; or cell utilization rate. In addition, the C-SCell may be activated in a case where the number of connected devices is equal to or greater than K, or may be deactivated in a case where the number of connected devices is less than K.
5) The C-SCell may be deactivated after specific time elapses from the activation.

Note that the C-SpCell may be a cell in which a specific signal can be transmitted and received among CCs that can be used by the device 10A, or may be a cell in which a specific operation is performed, and the name is not limited to this. For example, among the CCs that can be used by the device 10A, the C-SpCell may be a cell in which a synchronization signal (SS), PBCH, PRACH, PUCCH, or PSFCH can be transmitted and received. In addition, for example, among the CCs that can be used by the device 10A, a CC in which fallback scheduling or initial access can be performed may be the C-SpCell.

Note that the C-SCell may be a cell which can be used in addition to the C-SpCell among CCs that can be used by the device 10A, and the name is not limited to this. The activation or deactivation may be replaced with switching. Note that the above-described cell may be replaced with a BWP or a resource pool.

Figure 25:
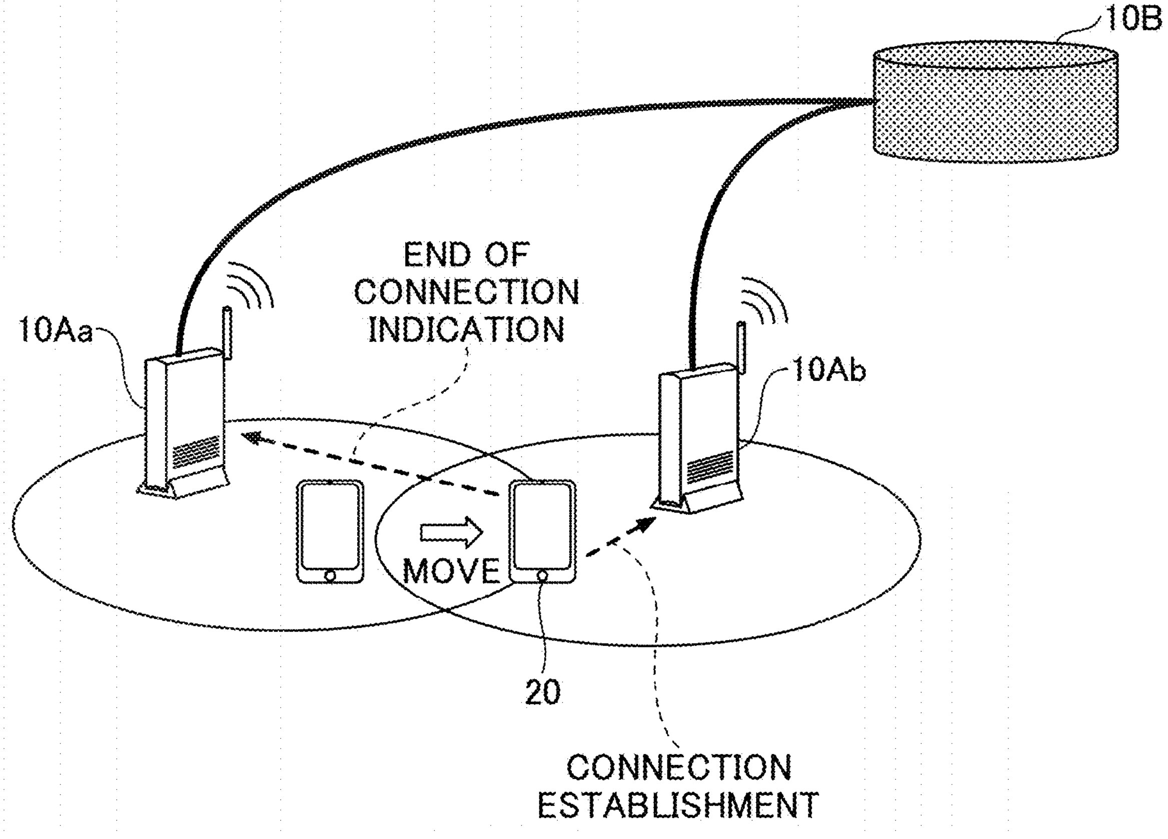
FIG. 25 is a drawing illustrating an example (9) of connecting to a plurality of devices in an embodiment of the present invention.

FIG. 25 is a drawing illustrating an example (9) of connecting to a plurality of devices in an embodiment of the present invention. As illustrated in FIG. 25, the terminal 20 may perform data transmission and reception by changing the connection destination from a device 10Aa to another device 10Ab. That is, a handover may be performed.

The terminal 20 may monitor signals from a plurality of devices 10A. In a case where the terminal 20 controls an operation related to handover, the terminal 20 may establish the connections with a plurality of devices 10A at the same time. The terminal 20 may perform connection with the device 10Ab, based on the connection situation with the device 10Aa. For example, in a case where the terminal 20 has performed an operation related to the connection termination with the device 10Aa (for example, the above-described operation related to the connection termination has been performed), the terminal 20 may perform connection establishment with the device 10Ab. In addition, for example, in a case where RSRP, RSRQ, or RSSI between the terminal 20 and the device 10Aa becomes less than a threshold value for X times or for a certain period, the terminal 20 may perform connection establishment with the device 10Ab. The terminal 20 may perform connection termination with the device 10Aa, based on the connection situation with the device 10Ab.

Figure 26:
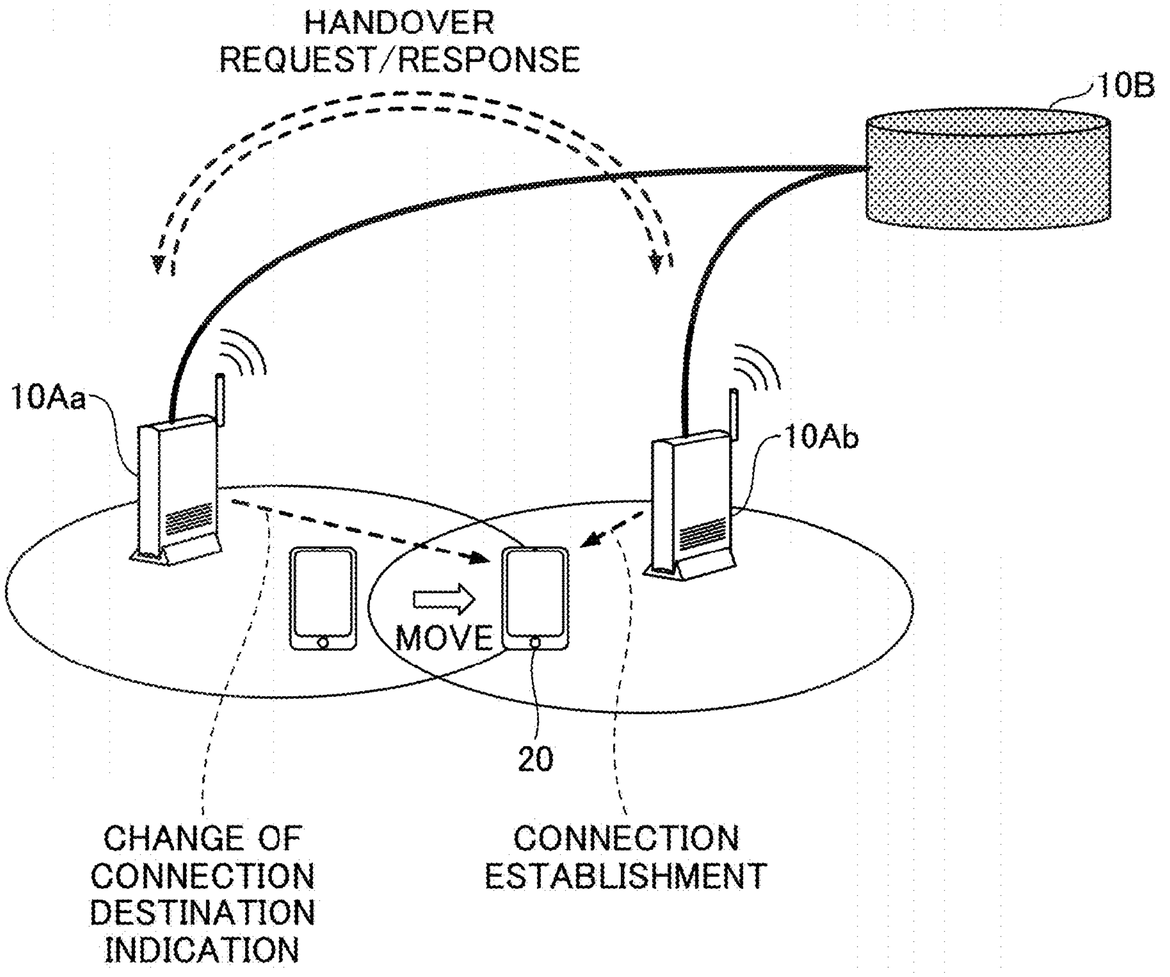
FIG. 26 is a drawing illustrating an example (10) of connecting to a plurality of devices in an embodiment of the present invention.

FIG. 26 is a drawing illustrating an example (10) of connecting to a plurality of devices in an embodiment of the present invention. As illustrated in FIG. 26, the terminal 20 may perform data transmission and reception by changing the connection destination from a device 10Aa to another device 10Ab. That is, a handover may be performed.

In a case where a device 10A controls an operation related to handover, the terminal 20 may report the monitoring situation of a signal from each device 10A to the device 10Aa. The device 10Aa may perform communication with the device 10Ab, based on information received from the terminal 20. For example, the handover request of the terminal 20, a response, information related to the terminal 20 (for example, ID, UE capability, or the like) may be shared according to the communication. The device 10Ab may perform communication with the device 10Aa, based on information received from the terminal 20. For example, the handover request of the terminal 20, response, information related to the terminal 20 (for example, ID, UE capability, or the like) may be shared according to the communication.

The device 10Ab may perform communication with the terminal 20, based on information received from the device 10Aa or the terminal 20. For example, a connection (handover) indication to the terminal 20, or a response may be performed according to the communication. The device 10Aa may perform communication with the terminal 20, based on information received from the device 10Ab or the terminal 20. For example, a connection (handover) indication to the terminal 20, or a response may be performed according to the communication.

Communications between C-APs related to the handover control, or the like, may be performed as described in the following 1) to 3).

1) Communication between devices 10A may be performed via the device 10B, or may be performed according to the direct communication between devices 10A.
2) The direct communication between devices 10 may be a sidelink communication. A dedicated resource may be used for the sidelink communication, or the resource may be configured by the device 10B. The resource may be autonomously selected by the device 10A, or may be determined based on an indication from the device 10B. Connections may be established between the devices 10A (for example, PC5-RRC connection). The device 10Ab with which the device 10Aa is to communicate may be indicated by the device 10B, or may be detected by the device 10Aa according to the sidelink communication.

The data relay between C-APs may be performed as described in the following 1) to 5).

1) Data directed to the terminal 20 may be transmitted from the device 10Aa to the device 10Ab (or, from the device 10Ab to the device 10Aa).
2) The device 10Aa or the device 10Ab may transmit the relayed data to the terminal 20.
3) Connection between the terminal 10Aa and the terminal 20 may be established, or is not required to be established.
4) The data transmission from the device 10Aa to the device 10Ab (or from the device 10Ab to the device 10Aa) may be performed according to any communication between C-APs.
5) Control information related to data transmission to the terminal 20 may be indicated together with the data transmission from the device 10Aa to the device 10Ab (or from the device 10Ab to the device 10Aa). The control information may be applied to an operation in which data transmission is performed with a plurality of devices 10A in the same frequency band.

According to the above-described embodiment, it becomes possible for the UE to be connected to a plurality of C-APs, and thus, the reliability and throughput can be improved.

The device 10A may enables the function X in a case where a predetermined condition is satisfied, and thereafter, the device 10A may autonomously operate without control from the device 10B. The predetermined condition may be a case in which the device 10A transitions to a state in which the function X can be enabled. In other words, in a system in which there is no device 10B, the device 10A may enable the function X and may autonomously operate.

Figure 27:
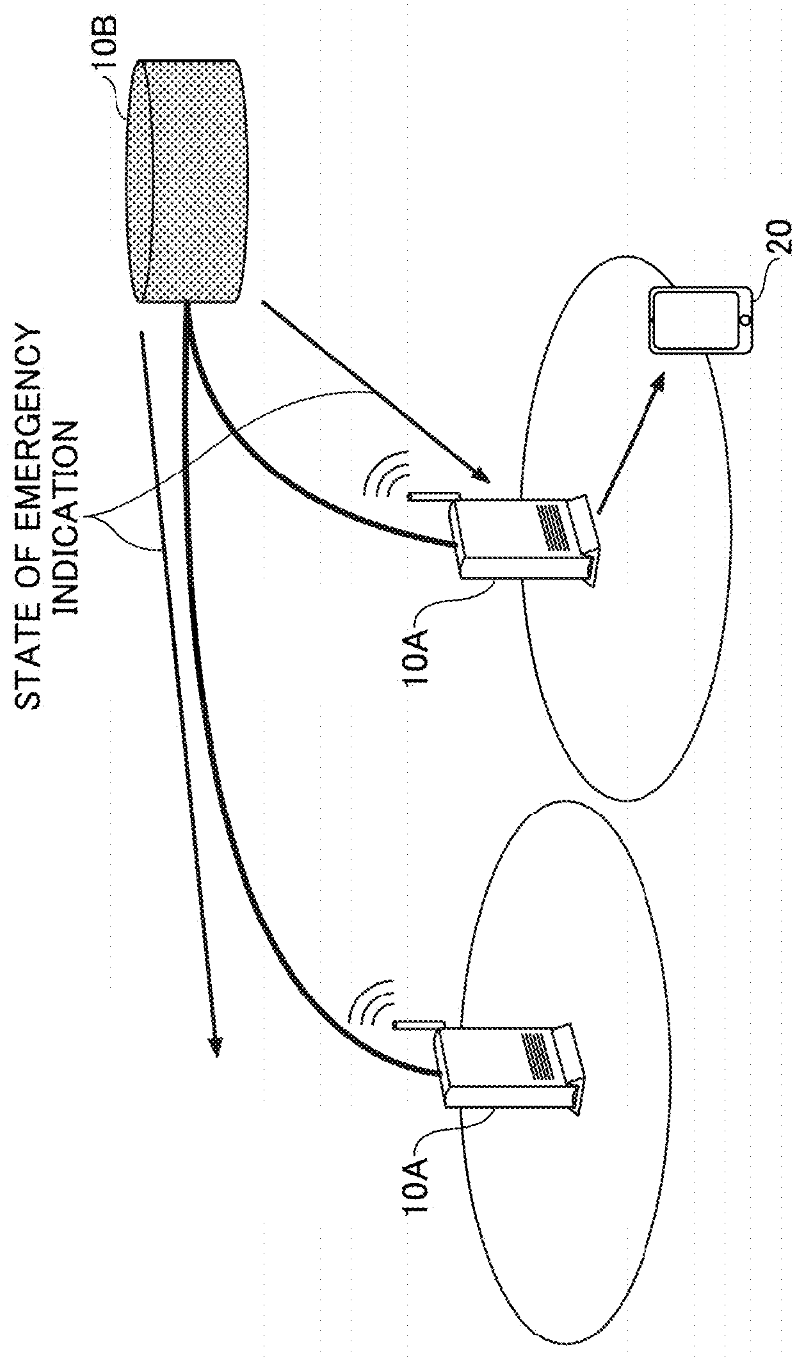
FIG. 27 is a drawing illustrating an example (1) of an operation related to a state of emergency indication in an embodiment of the present invention.

The predetermined condition may be a case in which a predetermined indication is received from the device 10B or another device 10C. FIG. 27 is a drawing illustrating an example (1) of an operation related to a state of emergency indication in an embodiment of the present invention. As illustrated in FIG. 27, the device 10A may enable the function X and autonomously operate in a case where a signal related to the state of emergency (for example, disaster occurrence) is received.

In addition, the device 10A may enable the function X and autonomously operate in a case where a signal permitting all devices 10A to enable the function X is received. The above-described another device 10C may be a device that is authorized to transmit a signal permitting the function X to be enabled with respect to all PLMNs without limiting to a specific PLMN.

Figure 28:
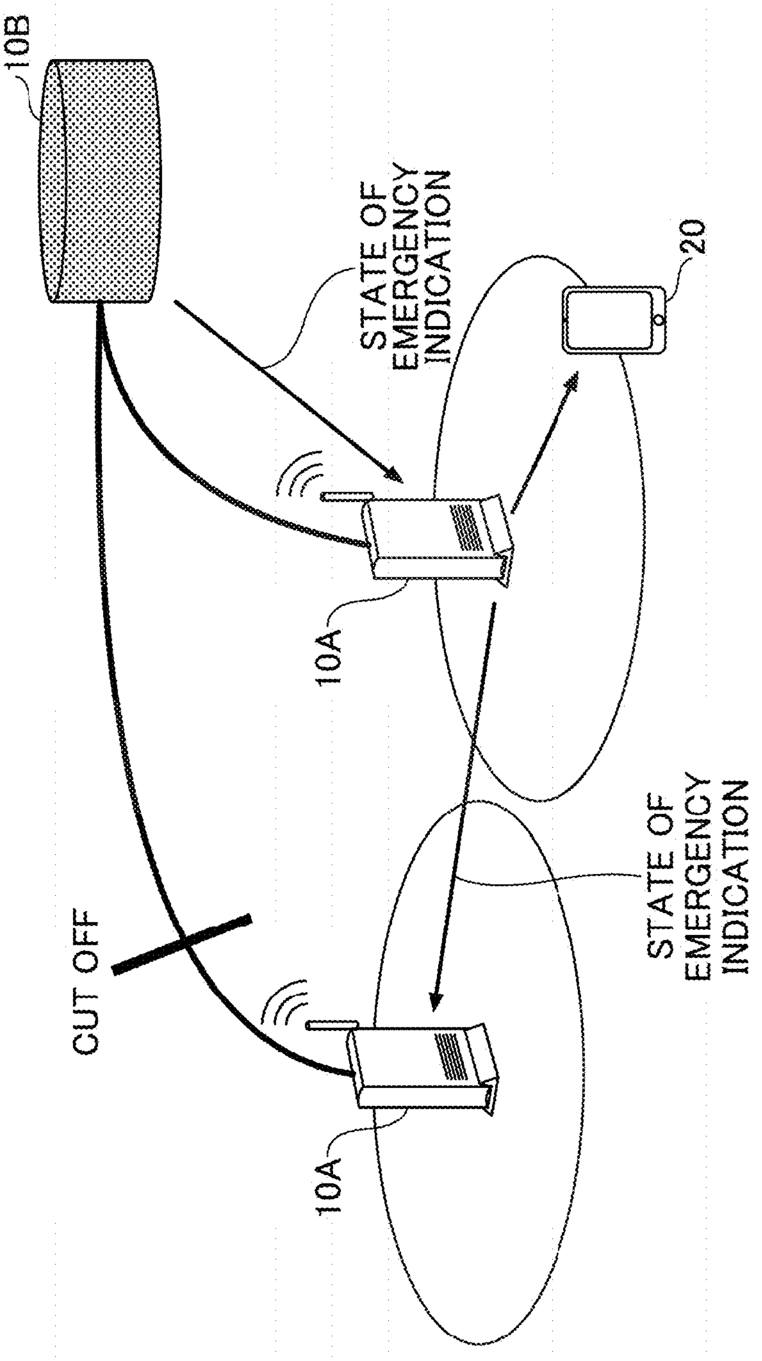
FIG. 28 is a drawing illustrating an example (2) of an operation related to a state of emergency indication in an embodiment of the present invention.

With respect to the predetermined condition, the function X may be enabled and an autonomous operation may be performed in a case where a predetermined indication is not received from the device 10B after a predetermined indication is received from another device (for example, the device 10A, the terminal 20, or the like). FIG. 28 is a drawing illustrating an example (2) of an operation related to a state of emergency indication in an embodiment of the present invention. As illustrated in FIG. 28, a device 10A that is in a situation in which the communication path to the device 10B is cut off may receive a signal related to the state of emergency (for example, disaster occurrence) from another device. In addition, the device 10A may enable the function X and autonomously operate in a case where a signal requesting some of or all of devices 10A to enable the function X is received from another device.

Operational contents or communication parameters related to the function X in a case of an autonomous operation may be indicated from the device 10B to the device 10A via a predetermined indication that triggers the operation. In addition, the operational contents or communication parameters related to the function X in a case of an autonomous operation may be determined by the device 10A without depending on the device 10B.

The operational contents or communication parameters related to the function X in a case of an autonomous operation may be different from those of an operation in a case of receiving control from the device 10B. For example, information may be exchanged with another device 10A, and the changing of the communication parameters may be autonomously performed based on the information. In addition, the communication parameters related to the function X in a case of an autonomous operation may be defined according to the technical specifications, and may be, for example, a fallback operation. In addition, in a case where a predetermined indication is received from the device 10B at the time of performing an operation related to the function X in a case of an autonomous operation, the transition to a state of disabling the function X or enabling the function X according to a control by the device 10B may be performed.

According to the above-described embodiment, even in a situation in which the control by the device 10B is not available, if a communication environment by the device 10A is required, the communication by the device 10A can be available.

According to the above-described embodiment, it is possible to establish a connection between the C-AP and the device that controls the C-AP, and the communication of the UE in the target PLMN can be performed via the C-AP.

That is, the network redundancy in a wireless communication system can be ensured.

(Apparatus Configuration)

Next, a functional configuration example of the base station 10 and the terminal 20 for performing the processes and operations described above will be described. The base station 10 and terminal 20 include functions for implementing the embodiments described above. It should be noted, however, that each of the base stations 10 and the terminal 20 may include only proposed functions in one of the embodiments.

<Base Station 10>

Figure 29:
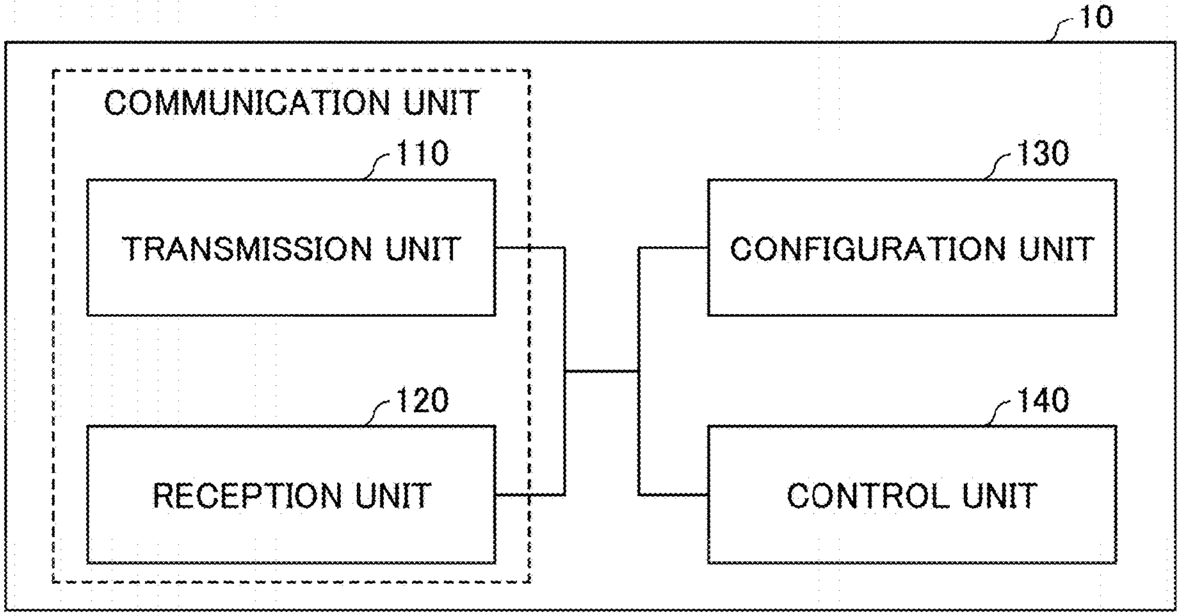
FIG. 29 is a drawing illustrating an example of a functional structure of a base station 10 in an embodiment of the present invention.

FIG. 29 is a diagram illustrating an example of a functional configuration of the base station 10. As shown in FIG. 29, the base station 10 includes a transmission unit 110, a reception unit 120, a configuration unit 130, and a control unit 140. The functional structure illustrated in FIG. 29 is merely an example. Functional divisions and names of functional units may be anything as long as operations according to an embodiment of the present invention can be performed. The transmission unit 110 and the reception unit 120 may be referred to as a communication unit.

The transmission unit 110 includes a function for generating a signal to be transmitted to the terminal 20 side and transmitting the signal wirelessly. The reception unit 120 includes a function for receiving various signals transmitted from the terminal 20 and acquiring, for example, information of a higher layer from the received signals. Further, the transmission unit 110 has a function of transmitting NR-PSS, NR-SSS, NR-PBCH, DL/UL control signals, the DL data, and the like, to the terminal 20. In addition, the transmission unit 110 transmits configuration information, or the like, described in the embodiment.

The configuration unit 130 stores preset configuration information and various configuration information items to be transmitted to the terminal 20 in a storage apparatus and reads the preset configuration information from the storage apparatus if necessary. The control unit 140 controls the entire base station 10 including, for example, a control related to signal transmission and reception and a control related to LBT. Note the functional unit related to signal transmission in the control unit 140 may be included in the transmission unit 110, and the functional unit related to signal reception in the control unit 140 may be included in the reception unit 120. Further, the transmission unit 110 and the reception unit 120 may be referred to as a transmitter and a receiver, respectively.

<Terminal 20>

Figure 30:
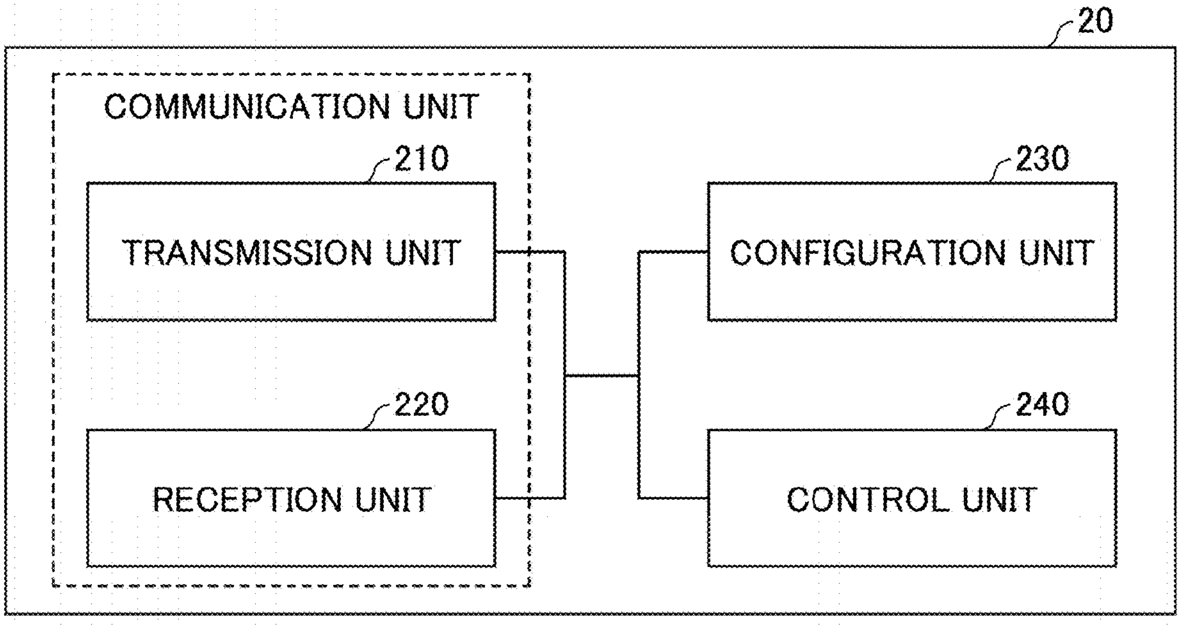
FIG. 30 is a drawing illustrating an example of a functional structure of a terminal 20 in an embodiment of the present invention.

FIG. 30 is a diagram illustrating an example of a functional configuration of the terminal 20. As shown in FIG. 30, the terminal 20 includes a transmission unit 210, a reception unit 220, a configuration unit 230, and a control unit 240. The functional structure illustrated in FIG. 30 is merely an example. Functional divisions and names of functional units may be anything as long as operations according to an embodiment of the present invention can be performed. The transmission unit 210 and the reception unit 220 may be referred to as a communication unit.

The transmission unit 210 generates a transmission signal from transmission data and transmits the transmission signal wirelessly. The reception unit 220 receives various signals wirelessly and obtains upper layer signals from the received physical layer signals. In addition, the transmission unit 210 transmits a HARQ-ACK, and the reception unit 220 receives configuration information described in the embodiment.

The configuration unit 230 stores, in a storage device, various configuration information items received from the base station 10 via the reception unit 220, and reads them from the storage device if necessary. In addition, the configuration unit 230 also stores pre-configured configuration information. The control unit 240 controls the entire terminal 20 including a control related to signal transmission and reception and a control related to LBT. Note the functional unit related to signal transmission in the control unit 240 may be included in the transmission unit 210, and the functional unit related to signal reception in the control unit 240 may be included in the reception unit 220. Further, the transmission unit 210 and the reception unit 220 may be referred to as a transmitter and a receiver, respectively.

(Hardware Structure)

In the above functional structure diagrams used for describing an embodiment of the present invention (FIG. 29 and FIG. 30), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 31:
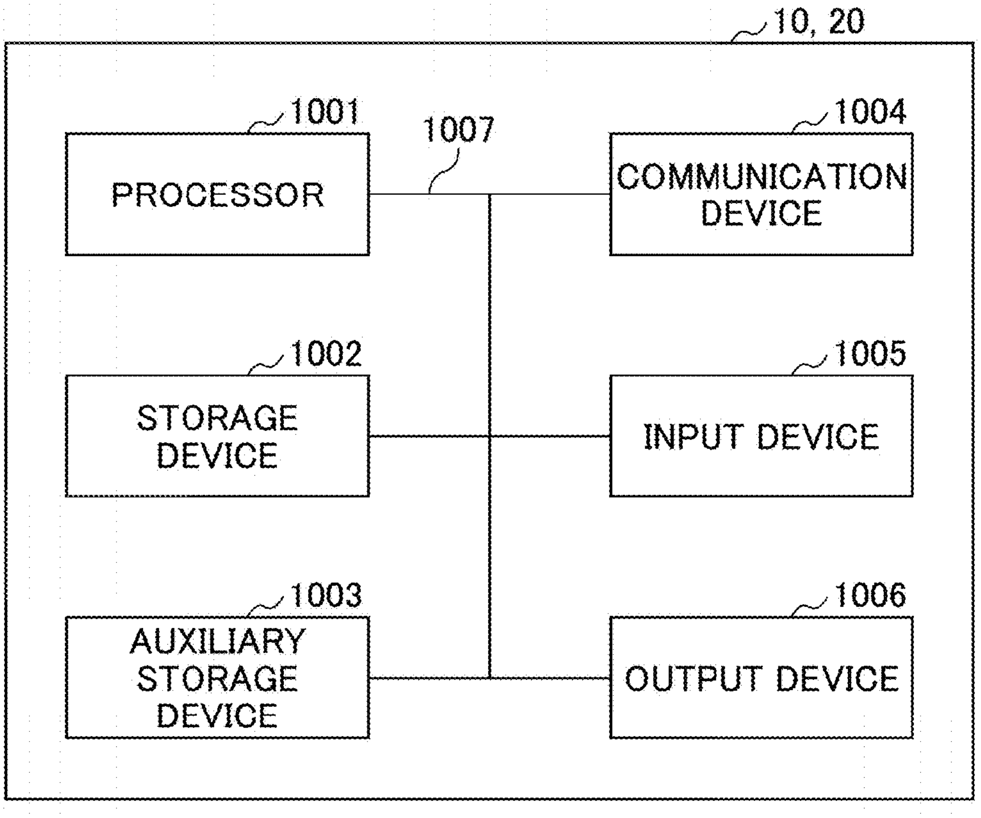
FIG. 31 is a drawing illustrating an example of a hardware structure of the base station 10 or the terminal 20 in an embodiment of the present invention.

For example, the base station 10, terminal 20, etc., according to an embodiment of the present disclosure may function as a computer for processing the radio communication method of the present disclosure. FIG. 31 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 29 may be realized by control programs that are stored in the storage device 1002 and are executed by the processor 1001. Further, for example, the control unit 240 of the terminal 20 illustrated in FIG. 30 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a communication device is provided. The communication device includes: a transmission unit configured to transmit a connection request to a first communication device; a reception unit configured to receive connection permission from the first communication device; and a control unit configured to establish a first connection to the first communication device. The control unit controls a wireless communication of a second communication device, and, in a case where a connection to the first communication device is established, the reception unit receives a signal related to execution of a function of controlling the wireless communication of the second communication device and performing the wireless communication of the second communication device, and the control unit performs enabling or disabling of the function, based on the signal related to the execution of the function.

According to the above configuration, a connection can be established between the C-AP and the device that controls the C-AP and communication of the UE in the target PLMN can be performed via the C-AP. That is, the network redundancy in a wireless communication system can be ensured.

The reception unit may receive an indication for enabling the function from the first communication device. According to the above configuration, the communication of the UE in the target PLMN can be performed via the C-AP.

The signal related to the execution of the function may be transmitted according to a trigger by the first communication device, a trigger by the second communication device, or a trigger by the device itself. According to the above configuration, a signal for enabling as a C-AP can be transmitted according to a trigger by a device that controls the C-AP, a trigger by the terminal, or the communication device itself.

The reception unit may receive a signal indicating recruitment of a communication device that enables the function from the first communication device. According to the above configuration, the device that controls the C-AP performs recruitment of a candidate that can be a C-AP.

The transmission unit may transmit a signal indicating candidacy of a communication device that enables the function to the first communication device. According to the above configuration, a communication device can indicate that the communication device can be a C-AP to the device that controls the C-AP.

In addition, according to an embodiment of the present invention, a communication method performed by a communication device is provided. The communication method includes: transmitting a connection request to a first communication device; receiving connection permission from the first communication device; establishing a first connection to the first communication device; controlling a wireless communication of a second communication device; and, in a case where a connection to the first communication device is established, receiving a signal related to execution of a function of controlling the wireless communication of the second communication device and performing the wireless communication of the second communication device, and performing enabling or disabling of the function, based on the signal related to the execution of the function.

According to the above configuration, a connection can be established between the C-AP and the device that controls the C-AP and communication of the UE in the target PLMN can be performed via the C-AP. That is, the network redundancy in a wireless communication system can be ensured.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "base on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts", "circuits", "devices", etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.) may be replaced with a TTI having a time length exceeding 1 ms, and the short TTI (e.g., shortened TTI, etc.) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in an RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), subcarrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a terminal 20, one or more BWPs may be configured in one carrier.

At least one of the configured BWPs may be activated, and the terminal 20 may assume that the terminal 20 will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in an RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

Each aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

It is noted that the device 10B is an example of the first communication device in the present disclosure. The terminal 20 is an example of the second communication device. The function X is an example of a function of controlling a wireless communication with a terminal and performing the wireless communication of the terminal. The signal P is an example of a signal related to performing the function of controlling the wireless communication with the terminal and the function of performing the wireless communication with the terminal.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
30 Core network
1001 Processor
1002 Storage device
1003 Auxiliary storage device
1004 Communication device
1005 Input device
1006 Output device

The invention claimed is:

1. A communication device comprising:

a transmitter configured to transmit a connection request to a first communication device;

a receiver configured to receive connection permission from the first communication device; and a controller configured to establish a first connection to the first communication device, wherein, in a case where a connection to the first communication device is established, the receiver receives, from the first communication device, a signal indicating recruitment of a Configurable Access Point (C-AP) that enables a function of controlling the wireless communication of a terminal and performing the wireless communication of the terminal, the transmitter transmits a signal announcing candidacy for the C-AP that enables the function to the first communication device, and the receiver receives an indication for enabling the function from the first communication device, and the controller performs enabling of the function, based on the indication for enabling the function.

2. The communication device as claimed in claim 1, wherein the indication for enabling the function is transmitted according to a trigger by the first communication device, a trigger by the terminal, or a trigger by the communication device itself.

3. A communication method performed by a communication device, the communication method comprising:

transmitting a connection request to a first communication device;

receiving connection permission from the first communication device;

establishing a first connection to the first communication device;

in a case where a connection to the first communication device is established, receiving, from the first communication device, a signal indicating recruitment of a Configurable Access Point (C-AP) device that enables a function of controlling the wireless communication of a terminal and performing the wireless communication of the terminal, transmitting a signal announcing candidacy for the C-AP that enables the function to the first communication device, and receiving an indication for enabling the function from the first communication device; and performing enabling of the function, based on the indication for enabling the function.

* * * * *